US012571997B2

(12) United States Patent
Liu

(10) Patent No.: US 12,571,997 B2
(45) Date of Patent: Mar. 10, 2026

(54) IMAGE CAPTURING LENS

(71) Applicant: GUANGZHOU LUXVISIONS INNOVATION TECHNOLOGY LIMITED, Guangzhou (CN)

(72) Inventor: Yi-Wei Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 286 days.

(21) Appl. No.: 18/481,984

(22) Filed: Oct. 5, 2023

(65) Prior Publication Data

US 2024/0272405 A1      Aug. 15, 2024

(30) Foreign Application Priority Data

Feb. 15, 2023    (CN) .......................... 202310117990.6

(51) Int. Cl.
*G02B 13/00*          (2006.01)
*G02B 9/64*          (2006.01)
(52) U.S. Cl.
CPC ............. *G02B 13/006* (2013.01); *G02B 9/64* (2013.01); *G02B 13/0045* (2013.01)
(58) Field of Classification Search
CPC ............................... G02B 9/64; G02B 13/0045
See application file for complete search history.

(56) References Cited

U.S. PATENT DOCUMENTS

2020/0064595 A1* 2/2020 Huang .............. G02B 13/0045
2022/0365316 A1   11/2022 Jia et al.

FOREIGN PATENT DOCUMENTS

| CN | 111965791 | 11/2020 | |
| CN | 212540837 | 2/2021 | |
| CN | 114236757 | 3/2022 | |
| CN | 114994867 A * | 9/2022 | ............... G02B 9/64 |

OTHER PUBLICATIONS

"Office Action of China Counterpart Application", issued on Apr. 3, 2025, p. 1-p. 12.

* cited by examiner

*Primary Examiner* — Alexander P Gross
(74) *Attorney, Agent, or Firm* — JCIPRNET

(57) ABSTRACT

An image capturing lens sequentially includes a first lens to a seventh lens from an object side to an image side along an optical axis. The first lens has a positive refracting power. The second lens has a negative refracting power. The third lens has a positive refracting power. The fourth lens has a negative refracting power. The fifth lens has a positive refracting power. The fourth lens and the fifth lens form a cemented lens. The sixth lens has a positive refracting power. The seventh lens has a negative refracting power.

9 Claims, 12 Drawing Sheets

Vertical chromatic aberration
FOV(° )

Axial aberration
Pupil

Distortion
FOV(° )

Vertical chromatic aberration

FOV(° )

Axial aberration

Pupil

Distortion

FOV(° )

Vertical chromatic aberration
FOV(° )

Axial aberration
Pupil

465nm
550nm
630nm

Distortion
FOV(° )

465nm
550nm
630nm

Vertical chromatic aberration
FOV(° )

Axial aberration
Pupil

Distortion
FOV(° )

Vertical chromatic aberration
FOV(° )

(μm)

Axial aberration
Pupil

| | |
|---|---|
| —— | 465nm |
| ------- | 550nm |
| —·—·— | 630nm |

(mm)

Distortion
FOV(° )

| | |
|---|---|
| —— | 465nm |
| ------- | 550nm |
| —·—·— | 630nm |

(%)

Vertical chromatic aberration

IMAGE CAPTURING LENS

CROSS-REFERENCE TO RELATED APPLICATION

This application claims the priority benefit of China application no. 202310117990.6, filed on Feb. 15, 2023. The entirety of the above-mentioned patent application is hereby incorporated by reference herein and made a part of this specification.

BACKGROUND

Technical Field

The disclosure relates to an optical device; more particularly, the disclosure relates to an image capturing lens.

Description of Related Art

The landscape of portable electronic device specifications is in constant flux, and an optical image capturing lens, as a critical component, is likewise experiencing diversified advancements. In the realm of the image capturing lenses for portable electronic devices, the demand extends beyond merely achieving a larger aperture within a compact system length. There is also a quest for increased pixel count and higher resolution. To cater to diverse design requirements, these image capturing lenses frequently incorporate a plurality of lenses, making the assembly tolerance between each lens a critical concern.

SUMMARY

The disclosure provides an image capturing lens that includes a cemented lens and is capable of reducing an impact of assembly tolerance and improve production yield.

According to an embodiment of the disclosure, an image capturing lens is provided, and the image capturing lens sequentially includes a first lens, a second lens, a third lens, a fourth lens, a fifth lens, a sixth lens, and a seventh lens from an object side to an image side along an optical axis. The first lens has a positive refracting power. The second lens has a negative refracting power. The third lens has a positive refracting power. The fourth lens has a negative refracting power. The fifth lens has a positive refracting power, where the fourth lens and the fifth lens form a cemented lens. The sixth lens has a positive refracting power. The seventh lens has a negative refracting power. The image capturing lens satisfies a conditional expression:

$$0.18 \leq \frac{G34 + T4 + T5 + G56}{TTL} \leq 0.28,$$

where G34 is a gap between the third lens and the fourth lens on the optical axis, G56 is a gap between the fifth lens and the sixth lens on the optical axis, T4 is a thickness of the fourth lens on the optical axis, T5 is a thickness of the fifth lens on the optical axis, and TTL is a distance from an object side surface of the first lens to an image plane of the first lens on the optical axis.

In light of the foregoing, the image capturing lens provided in one or more embodiments of the disclosure includes a cemented lens formed by the fourth lens and the fifth lens, which may prevent the assembly tolerance between the two lenses caused by using discrete fourth and fifth lenses, and the image capturing lens may have good imaging quality. Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
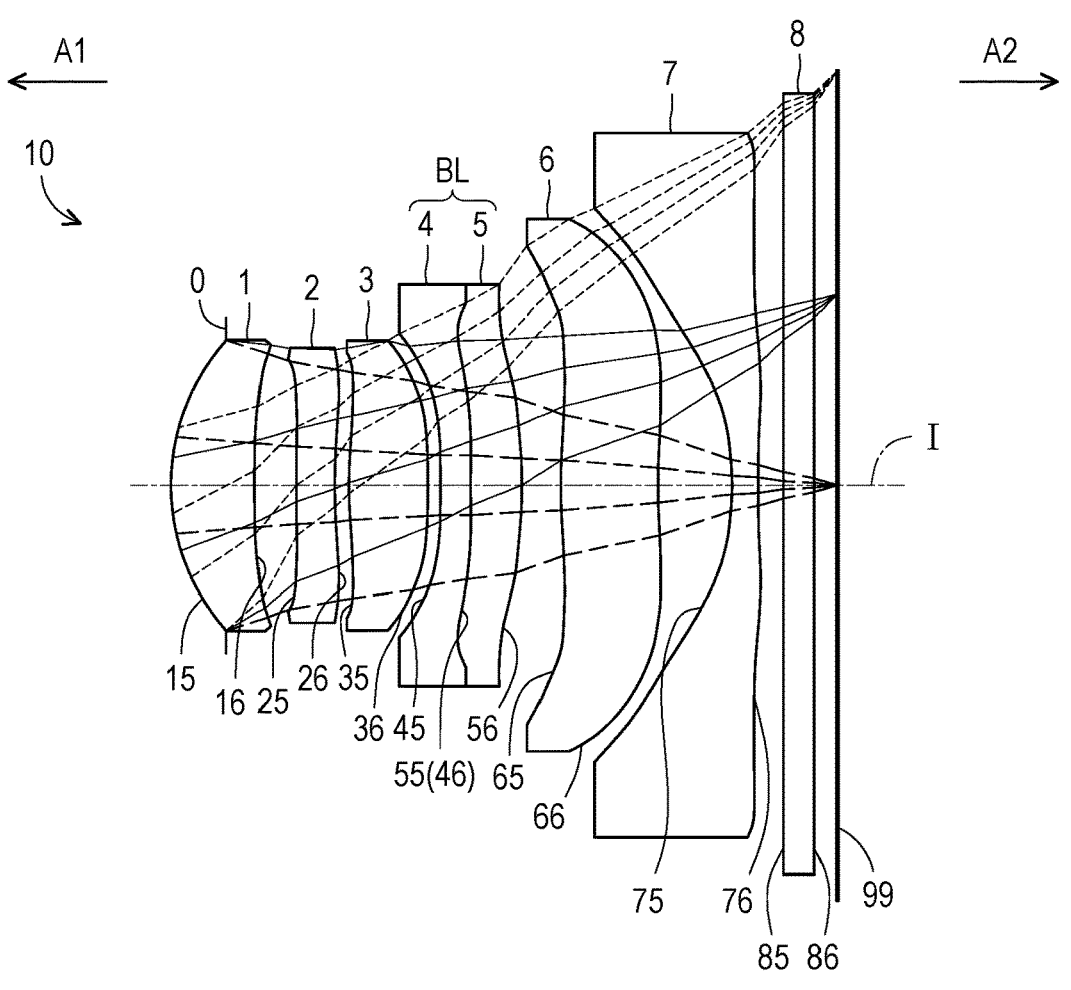
FIG. 1 is a schematic view illustrating an image capturing lens according to a first embodiment of the disclosure.

Please refer to FIG. 1, which schematically illustrates an image capturing lens according to a first embodiment of the disclosure. An image capturing lens 10 provided in the first embodiment of the disclosure sequentially includes an aperture 0, a first lens 1, a second lens 2, a third lens 3, a fourth lens 4, a fifth lens 5, a sixth lens 6, a seventh lens 7, and a filter 8 along an optical axis I of the image capturing lens 10 from an object side A1 to an image side A2. When a light beam emitted from an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on an image plane 99. The filter 8, for instance, is an infrared cut-off filter, which allows light beams with appropriate wavelengths (such as infrared or visible light beams) to pass through, and the filter 8 filters out an infrared band that is desired to be filtered out. The filter 8 is disposed between the seventh lens 7 and the image plane 99. It should be further noted that the object side A1 is a side facing the object to be shot, and the image side A2 is a side facing the image plane 99.

In the present embodiment, each of the first lens 1, the second lens 2, the third lens 3, the fourth lens 4, the fifth lens 5, the sixth lens 6, the seventh lens 7, and the filter 8 of the optical image capturing lens 10 has an object side surface 15, 25, 35, 45, 55, 65, 75, and 85 facing the object side A1 and allowing an imaging light beam to pass through, and has an image side surface 16, 26, 36, 46, 56, 66, 76, and 86 facing the image side A2 and allowing the imaging light beam to pass through. Here, the fourth lens 4 and the fifth lens 5 are cemented together through the image side surface 46 of the fourth lens 4 and the object side surface 55 of the fifth lens 5, thus forming a cemented lens BL and avoiding an assembly tolerance between the two lenses caused because of using the discrete fourth lens 4 and fifth lens 5. In the present embodiment, the aperture 0 is set on the object side A1 of the first lens 1.

The first lens 1 has a positive refracting power, an optical axis region of the object side surface 15 of the first lens 1 has a convex surface, an optical axis region of the image side surface 16 of the first lens 1 has a concave surface, and both the object side surface 15 and the image side surface 16 are aspheric surfaces. The second lens 2 has a negative refracting power, an optical axis region of the object side surface 25 of the second lens 2 has a convex surface, an optical axis region of the image side surface 26 of the second lens 2 has a concave surface, and both the object side surface 25 and the image side surface 26 are aspheric surfaces. The third lens 3 has a positive refracting power, an optical axis region of the object side surface 35 of the third lens 3 has a convex surface, an optical axis region of the image side surface 36 of the third lens 3 has a convex surface, and both the object side surface 35 and the image side surface 36 are aspheric surfaces. The fourth lens 4 has a negative refracting power, and an optical axis region of the object side surface 45 of the fourth lens 4 has a concave surface, which is an aspheric surface. The fifth lens 5 has a positive refracting power, an optical axis region of the object side surface 55 of the fifth lens 5 has a convex surface, an optical axis region of the image side surface 56 of the fifth lens 5 has a convex surface, and both the object side surface 55 and the image side surface 56 are aspheric surfaces. The sixth lens 6 has a positive refracting power, an optical axis region of the object side surface 65 of the sixth lens 6 has a convex surface, an optical axis region of the image side surface 66 of the sixth lens 6 has a concave surface, and both the object side surface 65 and the image side surface 66 are aspheric surfaces. The seventh lens 7 has a negative refracting power, an optical axis region of the object side surface 75 of the seventh lens 7 has a concave surface, an optical axis region of the image side surface 76 of the seventh lens 7 has a concave surface, and both the object side surface 75 and the image side surface 76 are aspheric surfaces. The cemented lens BL may have a positive or negative refracting power. An Abbe number of the fourth lens 4 falls within a range of 18 to 28, and a refractive index Nd of the fourth lens 4 falls within a range of 1.6 to 1.95.

Other detailed optical data provided in the first embodiment are shown in Table 1. A field of view (FOV) of the optical image capturing lens 10 is 380 and a f-stop (F number) is 1.77, which satisfies a conditional expression as follows:

$$\frac{TTL}{2ImgH} = 0.8,$$

where TTL is a distance from the object side surface 15 of the first lens to the image plane 99 on the optical axis I, and ImgH is half the length of a diagonal of an effective pixel region on the image plane 99.

TABLE 1

| Element | Surface | Curvature radius (mm) | Pitch (mm) | Refractive index | Abbe number |
|---|---|---|---|---|---|
| First lens 1 | Object side surface 15 | 1.659 | 0.628 | 1.54 | 55.9 |
| | Image side surface 16 | 4.550 | 0.332 | | |
| Second lens 2 | Object side surface 25 | 18.609 | 0.283 | 1.64 | 22.4 |
| | Image side surface 26 | 4.224 | 0.110 | | |
| Third lens 3 | Object side surface 35 | 3.966 | 0.597 | 1.54 | 55.9 |
| | Image side surface 36 | −16.639 | 0.109 | | |
| Fourth lens 4 | Object side surface 45 | −6.479 | 0.216 | 1.64 | 22.4 |
| Fifth lens 5 | Object side surface 55 | 8.181 | 0.402 | 1.54 | 55.9 |
| | Image side surface 56 | −4.468 | 0.292 | | |
| Sixth lens 6 | Object side surface 65 | 4.750 | 0.753 | 1.64 | 22.4 |
| | Image side surface 66 | 10.634 | 0.561 | | |

TABLE 1-continued

| Element | Surface | Curvature radius (mm) | Pitch (mm) | Refractive index | Abbe number |
|---|---|---|---|---|---|
| Seventh lens 7 | Object side surface 75 | −2.278 | 0.193 | 1.54 | 55.9 |
| | Image side surface 76 | 6.037 | 0.200 | | |
| Filter 8 | Object side surface 85 | infinite | 0.230 | 1.52 | 64.2 |
| | Image side surface 86 | infinite | 0.180 | | |
| | Image plane 99 | infinite | 0.00 | | |

In Table 1, a pitch of the object side surface 15 (as shown in Table 1 as 0.628 mm) is a thickness of the first lens 1 on the optical axis I, and a pitch of the image side surface 16 (as shown in Table 1 as 0.332 mm) is the distance on the optical axis I between the image side surface 16 of the first lens 1 and the object side surface 25 of the second lens 2, i.e., a gap on the optical axis I between the first lens 1 and the second lens 2, and the rest may be deduced therefrom.

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens

6, and the seventh lens 7 are all aspheric surfaces, and these aspheric surfaces are defined by a formula below:

$$Z(Y) = \frac{Y^2}{R} \Big/ \left(1 + \sqrt{1 - (1+K)\frac{Y^2}{R^2}}\right) + \sum_{i=1}^{n} a_{2i} \times Y^{2i} \tag{1}$$

Y: a distance between a point on an aspheric curve and the optical axis;

Z: an aspheric depth, i.e., a vertical distance between a point located on the aspheric surface and spaced from the optical axis by a distance Y and a tangent plane tangent to a vertex of the aspheric surface on the optical axis;

R: a curvature radius of the lens surface;

K: conic coefficient;

$a_{2i}$: the 2i-th order aspheric coefficient.

In the present embodiment, the conic coefficient K and various aspheric coefficients of the above-mentioned aspheric surface in the formula (1) are as shown in Table 2. In Table 2, the column numbered as 15 indicates that it refers to the aspheric coefficient of the object side surface 15 of the first lens 1, and the rest may be deduced therefrom for other numbered columns.

TABLE 2

| Surface | K | $a_2$ | $a_4$ | $a_6$ | $a_8$ |
|---|---|---|---|---|---|
| 15 | 0.000 | 0.000E+00 | −1.236E−02 | 6.885E−02 | −1.410E−01 |
| 16 | 0.000 | 0.000E+00 | 1.461E−02 | −1.573E−01 | 5.040E−01 |
| 25 | 0.220 | 0.000E+00 | −1.565E−01 | 2.029E−01 | −4.321E−01 |
| 26 | −0.027 | 0.000E+00 | −1.850E−01 | 1.474E−01 | −1.831E−01 |
| 35 | 0.000 | 0.000E+00 | −1.346E−01 | 1.501E−01 | −4.105E−01 |
| 36 | 46.311 | 0.000E+00 | −1.861E−01 | 1.375E−03 | 1.230E−03 |
| 45 | 0.000 | 0.000E+00 | −2.444E−01 | 2.101E−01 | −3.930E−01 |
| 55 | 0.000 | 0.000E+00 | −3.464E−01 | 3.293E−01 | −7.590E−02 |
| 56 | 0.000 | 0.000E+00 | −8.515E−02 | 7.226E−02 | 1.262E−02 |
| 65 | −1.158 | 0.000E+00 | −9.587E−02 | 2.257E−02 | 3.029E−03 |
| 66 | −0.901 | 0.000E+00 | −2.742E−02 | −2.783E−02 | 1.168E−02 |
| 75 | 0.000 | 0.000E+00 | −7.930E−02 | 4.451E−02 | −1.280E−02 |
| 76 | −0.143 | 0.000E+00 | −1.089E−01 | 4.562E−02 | −7.155E−03 |

| Surface | $a_{10}$ | $a_{12}$ | $a_{14}$ | $a_{16}$ | $a_{18}$ |
|---|---|---|---|---|---|
| 15 | 1.647E−01 | −8.557E−02 | 2.639E−03 | 1.522E−02 | −3.817E−03 |
| 16 | −8.531E−01 | 7.774E−01 | −3.273E−01 | 1.995E−02 | 1.730E−02 |
| 25 | 6.594E−01 | −5.962E−01 | 3.023E−01 | −6.978E−02 | 0.000E+00 |
| 26 | 2.026E−01 | −1.119E−01 | 1.898E−02 | 9.055E−03 | 0.000E+00 |
| 35 | 5.128E−01 | −3.393E−01 | 6.838E−02 | 2.081E−02 | −1.346E−03 |
| 36 | −1.037E−01 | 2.585E−01 | −2.400E−01 | 9.863E−02 | −1.555E−02 |
| 45 | 6.213E−01 | −5.281E−01 | 2.337E−01 | −4.206E−02 | −1.866E−03 |
| 55 | −1.593E−01 | 1.191E−01 | 2.758E−02 | −4.422E−02 | 1.001E−02 |
| 56 | −1.746E−02 | 9.349E−05 | 1.576E−03 | 2.229E−05 | −8.107E−05 |
| 65 | −7.446E−03 | 2.389E−03 | −8.315E−05 | −6.005E−05 | 6.886E−06 |
| 66 | −1.870E−03 | −1.122E−05 | 1.892E−04 | −7.492E−05 | 8.362E−06 |
| 75 | 5.854E−03 | −1.414E−03 | 2.973E−05 | 2.720E−05 | −2.067E−06 |
| 76 | −2.926E−04 | 2.529E−04 | −3.356E−05 | 1.722E−06 | −2.271E−08 |

Figure 2A:
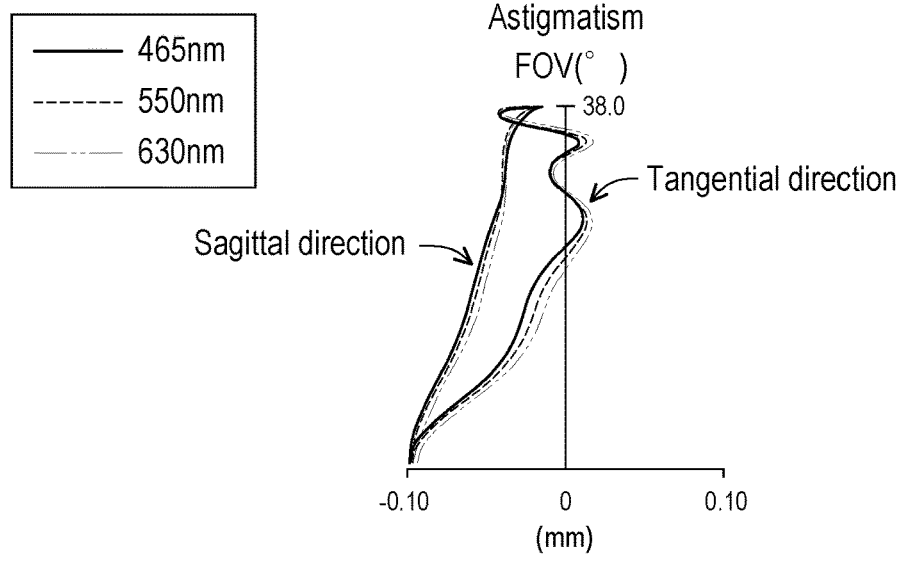
FIG. 2A is a schematic view illustrating astigmatism of the image capturing lens according to the first embodiment.
Figure 2B:
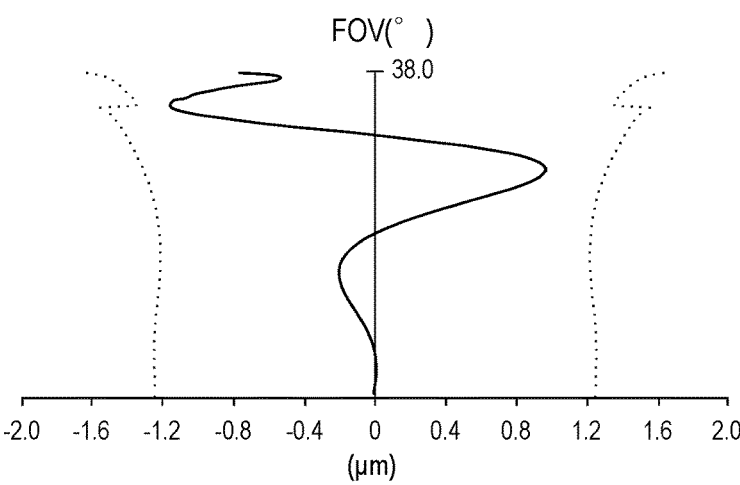
FIG. 2B is a schematic view illustrating vertical chromatic aberration of the image capturing lens according to the first embodiment.
Figure 2C:
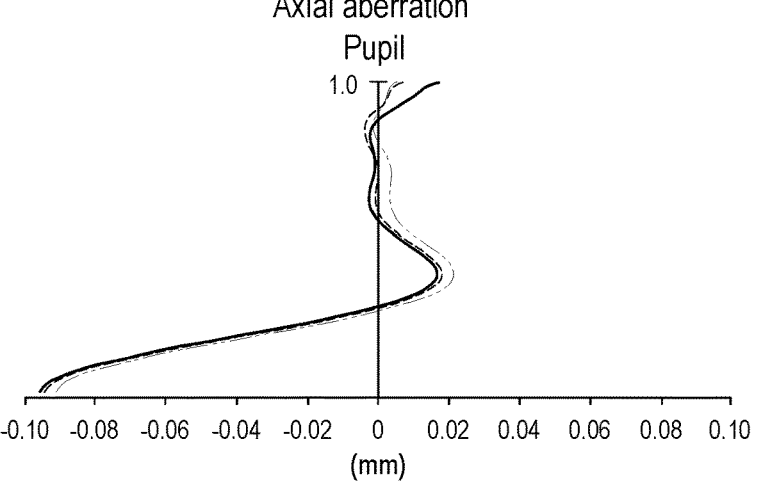
FIG. 2C is a schematic view illustrating axial aberration of the image capturing lens according to the first embodiment.
Figure 2D:
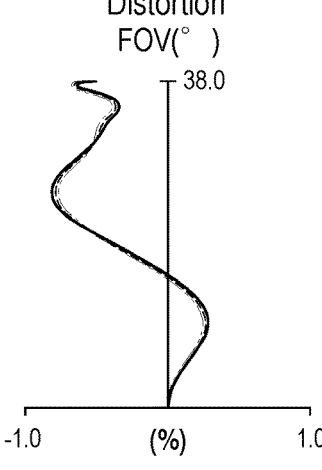
FIG. 2D is a schematic view illustrating distortion of the image capturing lens according to the first embodiment.

Please refer to FIG. 2A to FIG. 2D. FIG. 2A is a schematic view illustrating astigmatism of the image capturing lens according to the first embodiment, FIG. 2B is a schematic view illustrating vertical chromatic aberration of the image capturing lens according to the first embodiment, FIG. 2C is a schematic view illustrating axial aberration of the image capturing lens according to the first embodiment, and FIG. 2D is a schematic view illustrating distortion of the image capturing lens according to the first embodiment.

As shown in FIG. 2A, when different color beams with wavelengths of 465 nm, 550 nm, and 630 nm respectively are incident to the image capturing lens 10, the astigmatism of each color beam at different FOV falls within a range of ±0.10 mm. With reference to FIG. 2B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 2B, which schematically illustrates the vertical chromatic aberration, it may be learned that the vertical chromatic aberration of the image capturing lens 10 at different FOVs falls within a range of a diffraction limit (shown as the dotted line in FIG. 2B), and falls within a range of ±2.0 μm. With reference to FIG. 2C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.10 mm. The distortion aberration diagram in FIG. 2D shows that the distortion aberration of the image capturing lens 10 remains within a range of ±1%. Through FIG. 2A to FIG. 2D, it is demonstrated that the image capturing lens 10 provided in the first embodiment has good imaging quality.

In order to fully demonstrate various embodiments of the disclosure, other embodiments of the disclosure are described below. Note that the reference numbers and some content provided in the previous embodiments are also used in the following embodiments, where the same reference numbers serve to represent the same or similar components, and the description of the same technical content is omitted. The description of the omitted parts may be referred to as those provided in the previous embodiments and will not be repeated hereinafter.

Figure 3:
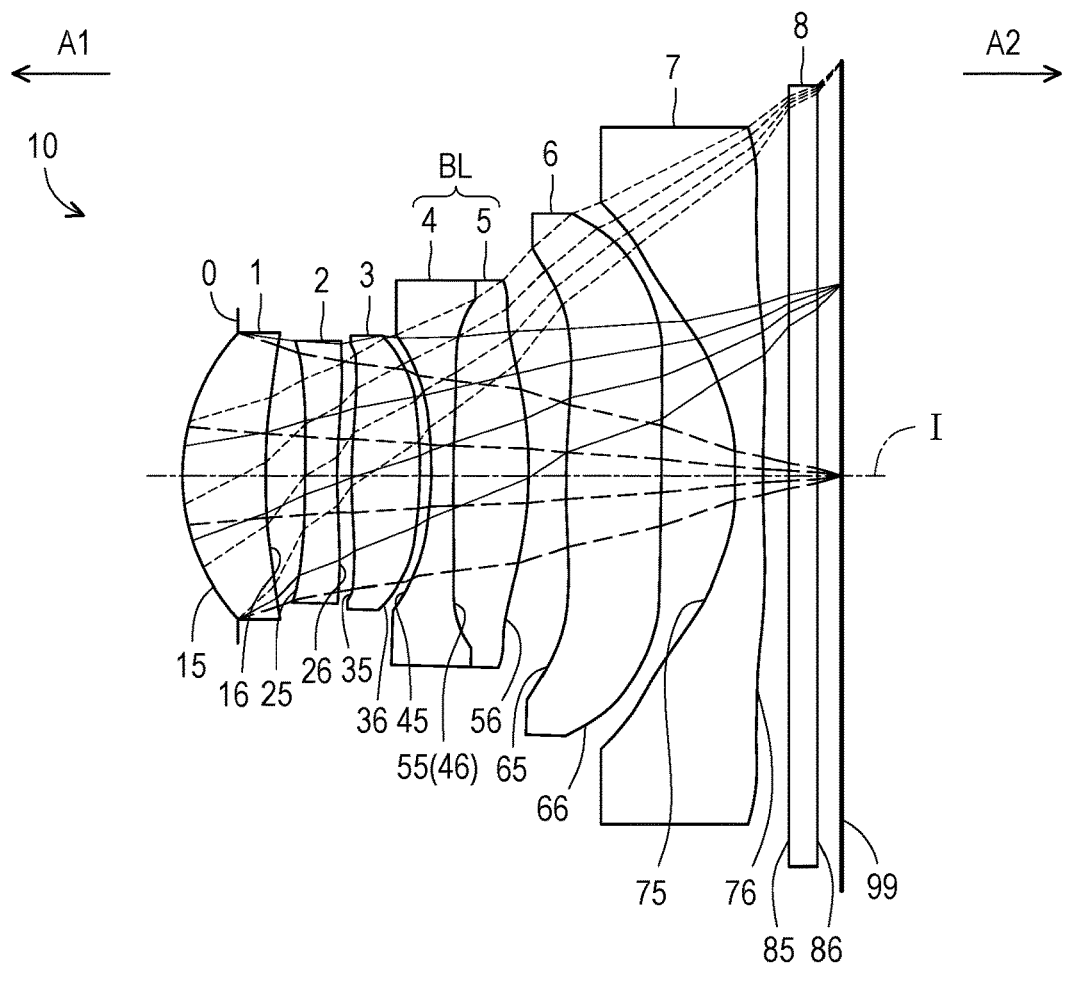
FIG. 3 is a schematic view illustrating an image capturing lens according to a second embodiment of the disclosure.

Please refer to FIG. 3, which schematically illustrates an image capturing lens according to a second embodiment of the disclosure. The image capturing lens 10 provided in the second embodiment of the disclosure sequentially includes an aperture 0, a first lens 1, a second lens 2, a third lens 3, a fourth lens 4, a fifth lens 5, a sixth lens 6, a seventh lens 7, and a filter 8 along the optical axis I of the image capturing lens 10 from the object side A1 to the image side A2. When the light emitted by an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on the image plane 99. The fourth lens 4 and the fifth lens 5 are cemented together through the image side surface 46 of the fourth lens 4 and the object side surface 55 of the fifth lens 5, thus forming a cemented lens BL. In the present embodiment, the aperture 0 is set on the object side A1 of the first lens 1.

The first lens 1 has a positive refracting power, the optical axis region of the object side surface 15 of the first lens 1 has a convex surface, the optical axis region of the image side surface 16 of the first lens 1 has a concave surface, and both the object side surface 15 and the image side surface 16 are aspheric surfaces. The second lens 2 has a negative refracting power, the optical axis region of the object side surface 25 of the second lens 2 has a convex surface, the optical axis region of the image side surface 26 of the second lens 2 has a concave surface, and both the object side surface 25 and the image side surface 26 are aspheric surfaces. The third lens 3 has a positive refracting power, the optical axis region of the object side surface 35 of the third lens 3 has a convex surface, the optical axis region of the image side surface 36 of the third lens 3 has a convex surface, and both the object side surface 35 and the image side surface 36 are aspheric surfaces. The fourth lens 4 has a negative refracting power, and the optical axis region of the object side surface 45 of the fourth lens 4 has a concave surface, which is an aspheric surface. The fifth lens 5 has a positive refracting power, the optical axis region of the object side surface 55 of the fifth lens 5 has a convex surface, the optical axis region of the image side surface 56 of the fifth lens 5 has a convex surface, and both the object side surface 55 and the image side surface 56 are aspheric surfaces. The sixth lens 6 has a positive refracting power, the optical axis region of the object side surface 65 of the sixth lens 6 has a convex surface, the optical axis region of the image side surface 66 of the sixth lens 6 has a concave surface, and both the object side surface 65 and the image side surface 66 are aspheric surfaces. The seventh lens 7 has a negative refracting power, the optical axis region of the object side surface 75 of the seventh lens 7 has a concave surface, the optical axis region of the image side surface 76 of the seventh lens 7 has a concave surface, and both the object side surface 75 and the image side surface 76 are aspheric surfaces. The cemented lens BL may have a positive or negative refracting power. The Abbe number of the fourth lens 4 falls within a range of 18 to 28, and the refractive index Nd of the fourth lens 4 falls within a range of 1.6 to 1.95.

Other detailed optical data provided in the second embodiment are shown in Table 3. The FOV of the optical image capturing lens 10 is 380 and the f-stop (F number) is 1.77, which satisfies a conditional expression as follows:

$$\frac{TTL}{2ImgH} = 0.79,$$

where TTL is the distance from the object side surface 15 of the first lens 1 to the image plane 99 on the optical axis I, and ImgH is half the length of the diagonal of the effective pixel region on the image plane 99.

TABLE 3

| Element | Surface | Curvature radius (mm) | Pitch (mm) | Refractive index | Abbe number |
|---|---|---|---|---|---|
| First lens 1 | Object side surface 15 | 1.643 | 0.633 | 1.54 | 55.9 |
| | Image side surface 16 | 4.612 | 0.300 | | |
| Second lens 2 | Object side surface 25 | 17.598 | 0.253 | 1.64 | 22.4 |
| | Image side surface 26 | 4.000 | 0.111 | | |

TABLE 3-continued

| Element | Surface | Curvature radius (mm) | Pitch (mm) | Refractive index | Abbe number |
|---------|---------|----------------------|-----------|-----------------|-------------|
| Third lens 3 | Object side surface 35 | 3.667 | 0.524 | 1.59 | 30.9 |
| | Image side surface 36 | −25.572 | 0.089 | | |
| Fourth lens 4 | Object side surface 45 | −5.894 | 0.176 | 1.64 | 22.4 |
| Fifth lens 5 | Object side surface 55 | 4.775 | 0.580 | 1.54 | 55.9 |
| | Image side surface 56 | −4.538 | 0.289 | | |
| Sixth lens 6 | Object side surface 65 | 4.263 | 0.733 | 1.64 | 22.4 |
| | Image side surface 66 | 8.300 | 0.575 | | |
| Seventh lens 7 | Object side surface 75 | −2.313 | 0.209 | 1.54 | 55.9 |
| | Image side surface 76 | 6.389 | 0.200 | | |

TABLE 3-continued

| Element | Surface | Curvature radius (mm) | Pitch (mm) | Refractive index | Abbe number |
|---------|---------|----------------------|-----------|-----------------|-------------|
| Filter 8 | Object side surface 85 | infinite | 0.230 | 1.52 | 64.2 |
| | Image side surface 86 | infinite | 0.180 | | |
| | Image plane 99 | infinite | 0.00 | | |

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens 6, and the seventh lens 7 are all aspheric surfaces, and these aspheric surfaces are defined by the above-mentioned formula (1).

In the present embodiment, the conic coefficient K and various aspheric coefficients of the above-mentioned aspheric surface in the formula (1) are as shown in Table 4. In Table 4, the column numbered as 15 indicates that it refers to the aspheric coefficient of the object side surface 15 of the first lens 1, and the rest may be deduced therefrom for other numbered columns.

TABLE 4

| Surface | K | $a_2$ | $a_4$ | $a_6$ | $a_8$ |
|---------|-----|-------|-------|-------|-------|
| 15 | −0.004 | 0.00E+00 | −1.12E−02 | 6.85E−02 | −1.41E−01 |
| 16 | 0.000 | 0.00E+00 | 1.21E−02 | −1.60E−01 | 5.02E−01 |
| 25 | −47.667 | 0.00E+00 | −1.58E−01 | 2.06E−01 | −4.29E−01 |
| 26 | 1.014 | 0.00E+00 | −1.82E−01 | 1.50E−01 | −1.80E−01 |
| 35 | 0.000 | 0.00E+00 | −1.30E−01 | 1.50E−01 | −4.13E−01 |
| 36 | 100.000 | 0.00E+00 | −1.95E−01 | −3.40E−04 | 3.89E−03 |
| 45 | 0.000 | 0.00E+00 | −2.43E−01 | 2.15E−01 | −3.91E−01 |
| 55 | 0.000 | 0.00E+00 | −2.88E−01 | 3.36E−01 | −7.78E−02 |
| 56 | 0.000 | 0.00E+00 | −8.55E−02 | 7.11E−02 | 1.29E−02 |
| 65 | −8.175 | 0.00E+00 | −1.00E−01 | 2.34E−02 | 3.06E−03 |
| 66 | −30.531 | 0.00E+00 | −3.01E−02 | −2.76E−02 | 1.18E−02 |
| 75 | 0.022 | 0.00E+00 | −7.98E−02 | 4.45E−02 | −1.28E−02 |
| 76 | 0.494 | 0.00E+00 | −1.09E−01 | 4.56E−02 | −7.14E−03 |

| Surface | $a_{10}$ | $a_{12}$ | $a_{14}$ | $a_{16}$ | $a_{18}$ |
|---------|----------|----------|----------|----------|----------|
| 15 | 1.64E−01 | −8.57E−02 | 2.62E−03 | 1.52E−02 | −3.99E−03 |
| 16 | −8.54E−01 | 7.77E−01 | −3.27E−01 | 2.05E−02 | 1.71E−02 |
| 25 | 6.60E−01 | −5.97E−01 | 3.01E−01 | −6.78E−02 | 0.00E+00 |
| 26 | 2.06E−01 | −1.10E−01 | 1.87E−02 | 7.12E−03 | 0.00E+00 |
| 35 | 5.09E−01 | −3.41E−01 | 6.78E−02 | 2.10E−02 | −1.46E−03 |
| 36 | −1.02E−01 | 2.58E−01 | −2.41E−01 | 9.80E−02 | −1.53E−02 |
| 45 | 6.22E−01 | −5.27E−01 | 2.34E−01 | −4.22E−02 | −3.16E−03 |
| 55 | −1.62E−01 | 1.18E−01 | 2.70E−02 | −4.42E−02 | 1.03E−02 |
| 56 | −1.73E−02 | 1.26E−04 | 1.57E−03 | 1.39E−05 | −8.17E−05 |
| 65 | −7.47E−03 | 2.38E−03 | −8.26E−05 | −5.92E−05 | 7.25E−06 |
| 66 | −1.87E−03 | −1.26E−05 | 1.89E−04 | −7.50E−05 | 8.32E−06 |
| 75 | 5.85E−03 | −1.41E−03 | 2.98E−05 | 2.72E−05 | −2.06E−06 |
| 76 | −2.95E−04 | 2.53E−04 | −3.36E−05 | 1.72E−06 | −2.22E−08 |

Figure 4A:
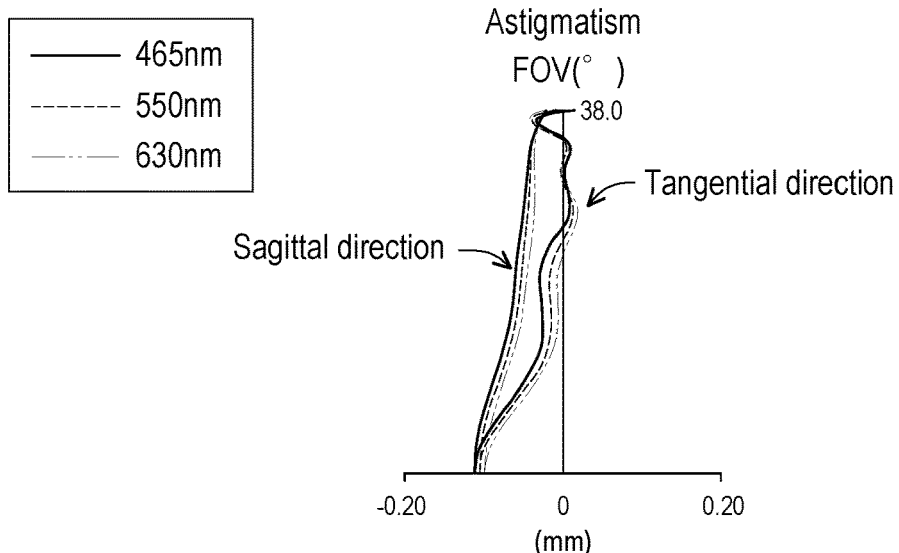
FIG. 4A is a schematic view illustrating astigmatism of the image capturing lens according to the second embodiment.
Figure 4B:
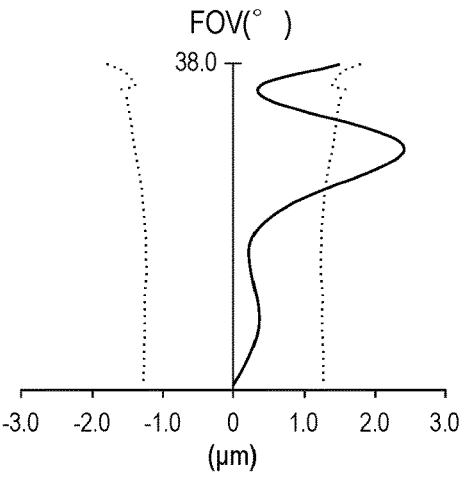
FIG. 4B is a schematic view illustrating vertical chromatic aberration of the image capturing lens according to the second embodiment.
Figure 4C:
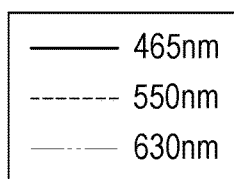
FIG. 4C is a schematic view illustrating axial aberration of the image capturing lens according to the second embodiment.
Figure 4C:
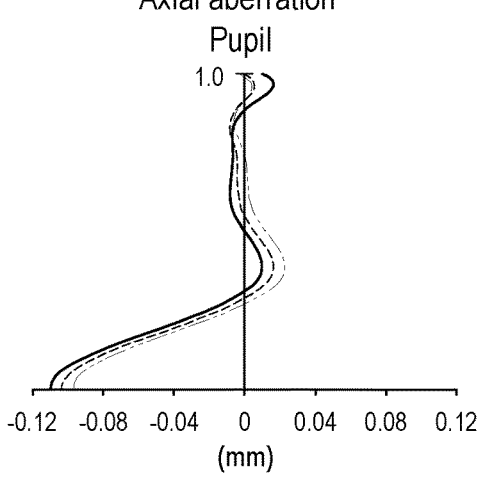
Figure 4D:
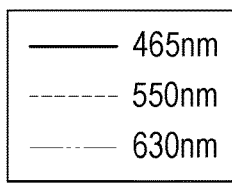
FIG. 4D is a schematic view illustrating distortion of the image capturing lens according to the second embodiment.
Figure 4D:
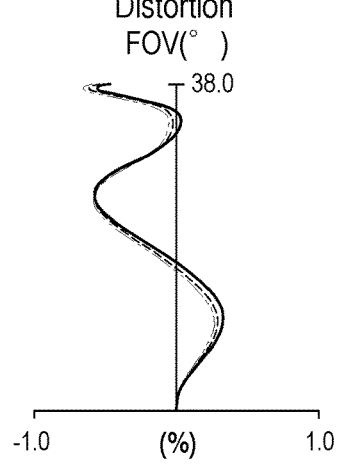

Please refer to FIG. 4A to FIG. 4D. FIG. 4A is a schematic view illustrating astigmatism of the image capturing lens according to the second embodiment, FIG. 4B is a schematic view illustrating vertical chromatic aberration of the image capturing lens according to the second embodiment, FIG. 4C is a schematic view illustrating axial aberration of the image capturing lens according to the second embodiment, and FIG. 4D is a schematic view illustrating distortion of the image capturing lens according to the second embodiment.

As shown in FIG. 4A, when different color beams with wavelengths of 465 nm, 550 nm, and 630 nm respectively are incident to the image capturing lens 10, the astigmatism of each color beam at different FOV falls within a range of ±0.20 mm. With reference to FIG. 4B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 4B, which schematically illustrates the vertical chromatic aberration, it may be learned that the vertical chromatic aberration of the image capturing lens 10 at different FOVs falls within a range of a diffraction limit (shown as the dotted line in FIG. 4B), and falls within a range of ±3.0 μm. With reference to FIG. 4C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.12 mm. The distortion aberration diagram in FIG. 4D shows that the distortion aberration of the image capturing lens 10 remains within a range of ±1%. Through FIG. 4A to FIG. 4D, it is demonstrated that the image capturing lens 10 provided in the second embodiment has good imaging quality.

Figure 5:
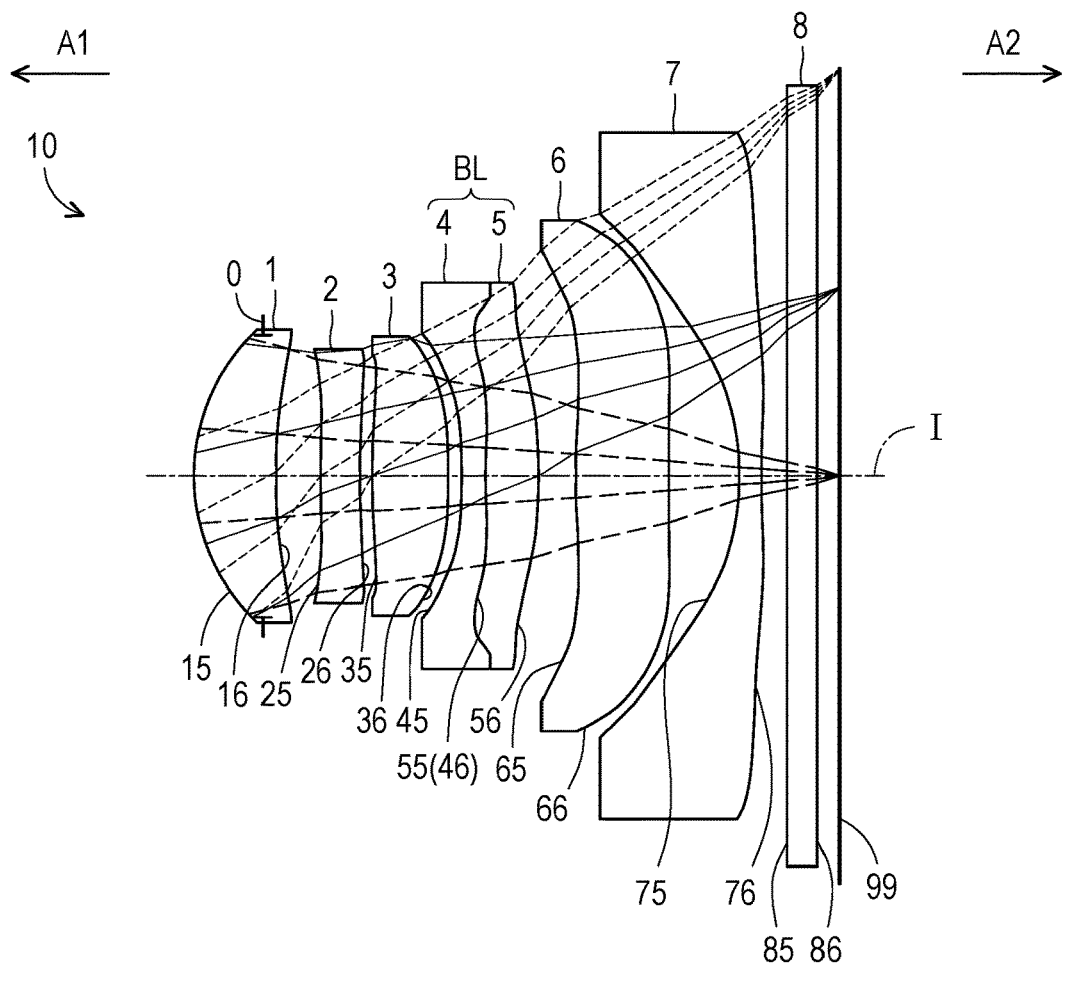
FIG. 5 is a schematic view illustrating an image capturing lens according to a third embodiment of the disclosure.

Please refer to FIG. 5, which schematically illustrates an image capturing lens according to a third embodiment of the disclosure. The image capturing lens 10 provided in the third embodiment of the disclosure sequentially includes an aperture 0, a first lens 1, a second lens 2, a third lens 3, a fourth lens 4, a fifth lens 5, a sixth lens 6, a seventh lens 7, and a filter 8 along the optical axis I of the image capturing lens 10 from the object side A1 to the image side A2. When the light emitted by an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on the image plane 99. The fourth lens 4 and the fifth lens 5 are cemented together through the image side surface 46 of the fourth lens 4 and the object side surface 55 of the fifth lens 5, thus forming a cemented lens BL. In the present embodiment, the aperture 0 is set on the object side A1 of the first lens 1.

The first lens 1 has a positive refracting power, the optical axis region of the object side surface 15 of the first lens 1 has a convex surface, the optical axis region of the image side surface 16 of the first lens 1 has a concave surface, and both the object side surface 15 and the image side surface 16 are aspheric surfaces. The second lens 2 has a negative refracting power, the optical axis region of the object side surface 25 of the second lens 2 has a convex surface, the optical axis region of the image side surface 26 of the second lens 2 has a concave surface, and both the object side surface 25 and the image side surface 26 are aspheric surfaces. The third lens 3 has a positive refracting power, the optical axis region of the object side surface 35 of the third lens 3 has a convex surface, the optical axis region of the image side surface 36 of the third lens 3 has a convex surface, and both the object side surface 35 and the image side surface 36 are aspheric surfaces. The fourth lens 4 has a negative refracting power, and the optical axis region of the object side surface 45 of the fourth lens 4 has a concave surface, which is an aspheric surface. The fifth lens 5 has a positive refracting power, the optical axis region of the object side surface 55 of the fifth lens 5 has a convex surface, the optical axis region of the image side surface 56 of the fifth lens 5 has a convex surface, and both the object side surface 55 and the image side surface 56 are aspheric surfaces. The sixth lens 6 has a positive refracting power, the optical axis region of the object side surface 65 of the sixth lens 6 has a convex surface, the optical axis region of the image side surface 66 of the sixth lens 6 has a concave surface, and both the object side surface 65 and the image side surface 66 are aspheric surfaces. The seventh lens 7 has a negative refracting power, the optical axis region of the object side surface 75 of the seventh lens 7 has a concave surface, the optical axis region of the image side surface 76 of the seventh lens 7 has a concave surface, and both the object side surface 75 and the image side surface 76 are aspheric surfaces. The cemented lens BL may have a positive or negative refracting power. The Abbe number of the fourth lens 4 falls within a range of 18 to 28, and the refractive index Nd of the fourth lens 4 falls within a range of 1.6 to 1.95.

Other detailed optical data provided in the third embodiment are shown in Table 5. The FOV of the optical image capturing lens 10 is 380 and the f-stop (F number) is 1.77, which satisfies a conditional expression as follows:

$$\frac{TTL}{2ImgH} = 0.787,$$

where TTL is the distance from the object side surface 15 of the first lens 1 to the image plane 99 on the optical axis I, and ImgH is half the length of the diagonal of the effective pixel region on the image plane 99.

TABLE 5

| Element | Surface | Curvature radius (mm) | Pitch (mm) | Refractive index | Abbe number |
|---|---|---|---|---|---|
| First lens 1 | Object side surface 15 | 1.656 | 0.645 | 1.54 | 55.9 |
|  | Image side surface 16 | 4.605 | 0.355 |  |  |
| Second lens 2 | Object side surface 25 | 14.797 | 0.303 | 1.61 | 26.9 |
|  | Image side surface 26 | 3.906 | 0.099 |  |  |
| Third lens 3 | Object side surface 35 | 4.233 | 0.595 | 1.54 | 55.9 |
|  | Image side surface 36 | −11.535 | 0.112 |  |  |
| Fourth lens 4 | Object side surface 45 | −5.586 | 0.187 | 1.64 | 22.4 |
| Fifth lens 5 | Object side surface 55 | 4.998 | 0.421 | 1.59 | 30.9 |
|  | Image side surface 56 | −4.057 | 0.293 |  |  |

TABLE 5-continued

| Element | Surface | Curvature radius (mm) | Pitch (mm) | Refractive index | Abbe number |
|---|---|---|---|---|---|
| Sixth lens 6 | Object side surface 65 | 6.114 | 0.726 | 1.64 | 22.4 |
| | Image side surface 66 | 10.966 | 0.557 | | |
| Seventh lens 7 | Object side surface 75 | −2.311 | 0.175 | 1.54 | 55.9 |
| | Image side surface 76 | 6.439 | 0.201 | | |
| Filter 8 | Object side surface 85 | infinite | 0.230 | 1.52 | 64.2 |
| | Image side surface 86 | infinite | 0.180 | | |
| | Image plane 99 | infinite | 0.00 | | |

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens 6, and the seventh lens 7 are all aspheric surfaces, and these aspheric surfaces are defined by the above-mentioned formula (1).

In the present embodiment, the conic coefficient K and various aspheric coefficients of the above-mentioned aspheric surface in the formula (1) are as shown in Table 6. In Table 6, the column numbered as 15 indicates that it refers to the aspheric coefficient of the object side surface 15 of the first lens 1, and the rest may be deduced therefrom for other numbered columns.

TABLE 6

| Surface | K | $a_2$ | $a_4$ | $a_6$ | $a_8$ |
|---|---|---|---|---|---|
| 15 | 0.000 | 0.00E+00 | −1.38E−02 | 6.88E−02 | −1.41E−01 |
| 16 | 0.000 | 0.00E+00 | 1.40E−02 | −1.56E−01 | 5.04E−01 |
| 25 | 0.532 | 0.00E+00 | −1.59E−01 | 2.03E−01 | −4.32E−01 |
| 26 | −0.035 | 0.00E+00 | −1.87E−01 | 1.47E−01 | −1.81E−01 |
| 35 | 0.000 | 0.00E+00 | −1.33E−01 | 1.53E−01 | −4.09E−01 |
| 36 | 10.653 | 0.00E+00 | −1.86E−01 | 5.36E−03 | −5.13E−04 |
| 45 | 0.000 | 0.00E+00 | −2.40E−01 | 2.08E−01 | −3.92E−01 |
| 55 | 0.000 | 0.00E+00 | −3.82E−01 | 3.25E−01 | −7.36E−02 |
| 56 | 0.000 | 0.00E+00 | −8.40E−02 | 7.27E−02 | 1.28E−02 |
| 65 | −1.125 | 0.00E+00 | −9.87E−02 | 2.31E−02 | 3.30E−03 |
| 66 | −0.227 | 0.00E+00 | −3.02E−02 | −2.72E−02 | 1.15E−02 |
| 75 | 0.000 | 0.00E+00 | −8.02E−02 | 4.35E−02 | −1.29E−02 |
| 76 | −0.139 | 0.00E+00 | −1.10E−01 | 4.56E−02 | −7.15E−03 |

| Surface | $a_{10}$ | $a_{12}$ | $a_{14}$ | $a_{16}$ | $a_{18}$ |
|---|---|---|---|---|---|
| 15 | 1.64E−01 | −8.57E−02 | 2.73E−03 | 1.53E−02 | −4.05E−03 |
| 16 | −8.54E−01 | 7.77E−01 | −3.27E−01 | 2.04E−02 | 1.61E−02 |
| 25 | 6.59E−01 | −5.96E−01 | 3.02E−01 | −7.11E−02 | 1.84E−04 |
| 26 | 2.05E−01 | −1.10E−01 | 2.06E−02 | 1.06E−02 | 1.26E−04 |
| 35 | 5.14E−01 | −3.38E−01 | 6.98E−02 | 2.26E−02 | 6.51E−04 |
| 36 | −1.05E−01 | 2.58E−01 | −2.40E−01 | 9.89E−02 | −1.56E−02 |
| 45 | 6.22E−01 | −5.29E−01 | 2.33E−01 | −4.22E−02 | −1.50E−03 |
| 55 | −1.56E−01 | 1.21E−01 | 2.82E−02 | −4.42E−02 | 9.77E−03 |
| 56 | −1.73E−02 | 1.57E−04 | 1.59E−03 | 1.87E−05 | −8.94E−05 |
| 65 | −7.39E−03 | 2.40E−03 | −8.28E−05 | −6.06E−05 | 6.47E−06 |
| 66 | −1.90E−03 | −1.27E−05 | 1.89E−04 | −7.49E−05 | 8.37E−06 |
| 75 | 5.85E−03 | −1.41E−03 | 2.99E−05 | 2.73E−05 | −2.05E−06 |
| 76 | −2.92E−04 | 2.53E−04 | −3.36E−05 | 1.72E−06 | −2.25E−08 |

| Surface | $a_{20}$ |
|---|---|
| 15 | 0.00E+00 |
| 16 | 0.00E+00 |
| 25 | 0.00E+00 |
| 26 | 0.00E+00 |
| 35 | 0.00E+00 |
| 36 | 0.00E+00 |
| 45 | 8.62E−05 |
| 55 | −4.41E−05 |
| 56 | 2.62E−09 |
| 65 | 0.00E+00 |
| 66 | 0.00E+00 |
| 75 | 0.00E+00 |
| 76 | 0.00E+00 |

Figure 6A:
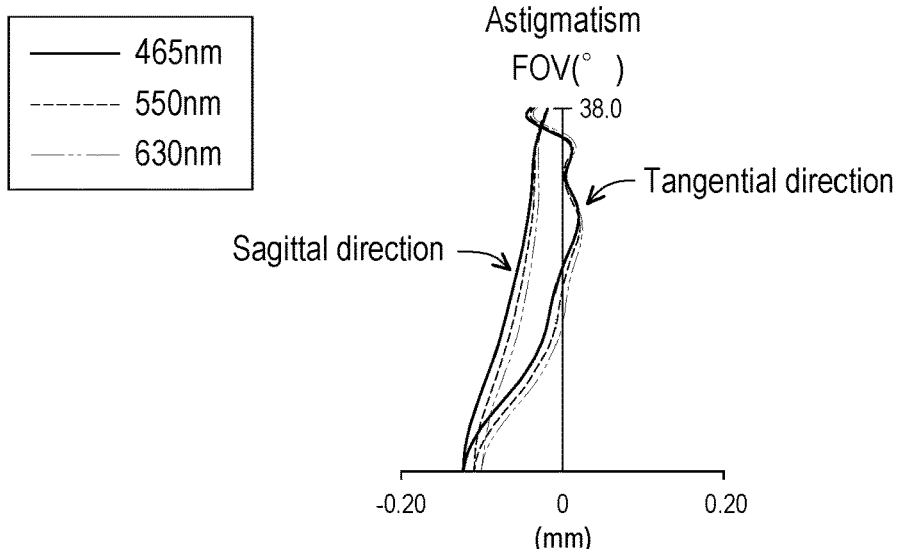
FIG. 6A is a schematic view illustrating astigmatism of the image capturing lens according to the third embodiment.
Figure 6B:
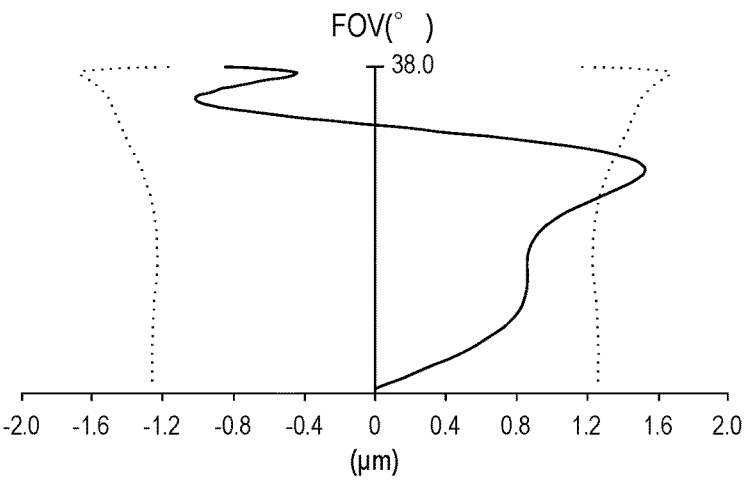
FIG. 6B is a schematic view illustrating vertical chromatic aberration of the image capturing lens according to the third embodiment.
Figure 6C:
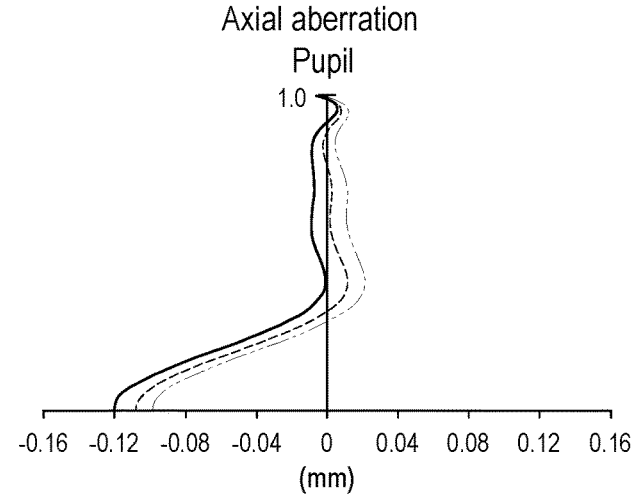
FIG. 6C is a schematic view illustrating axial aberration of the image capturing lens according to the third embodiment.
Figure 6D:
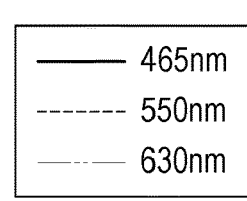
FIG. 6D is a schematic view illustrating distortion of the image capturing lens according to the third embodiment.
Figure 6D:
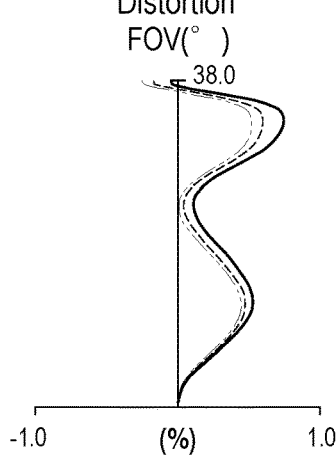

Please refer to FIG. 6A to FIG. 6D. FIG. 6A is a schematic view illustrating astigmatism of the image capturing lens according to the third embodiment, FIG. 6B is a schematic view illustrating vertical chromatic aberration of the image capturing lens according to the third embodiment, FIG. 6C is a schematic view illustrating axial aberration of the image capturing lens according to the third embodiment, and FIG. 6D is a schematic view illustrating distortion of the image capturing lens according to the third embodiment.

As shown in FIG. 6A, when different color beams with wavelengths of 465 nm, 550 nm, and 630 nm respectively are incident to the image capturing lens 10, the astigmatism of each color beam at different FOV falls within a range of ±0.20 mm. With reference to FIG. 6B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 6B, which schematically illustrates the vertical chromatic aberration, it may be learned that the vertical chromatic aberration of the image capturing lens 10 at different FOVs falls within a range of a diffraction limit (shown as the dotted line in FIG. 6B), and falls within a range of ±2.0 μm. With reference to FIG. 6C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.16 mm. The distortion aberration diagram in FIG. 6D shows that the distortion aberration of the image capturing lens 10 remains within a range of ±1%. Through FIG. 6A to FIG. 6D, it is demonstrated that the image capturing lens 10 provided in the third embodiment has good imaging quality.

Figure 7:
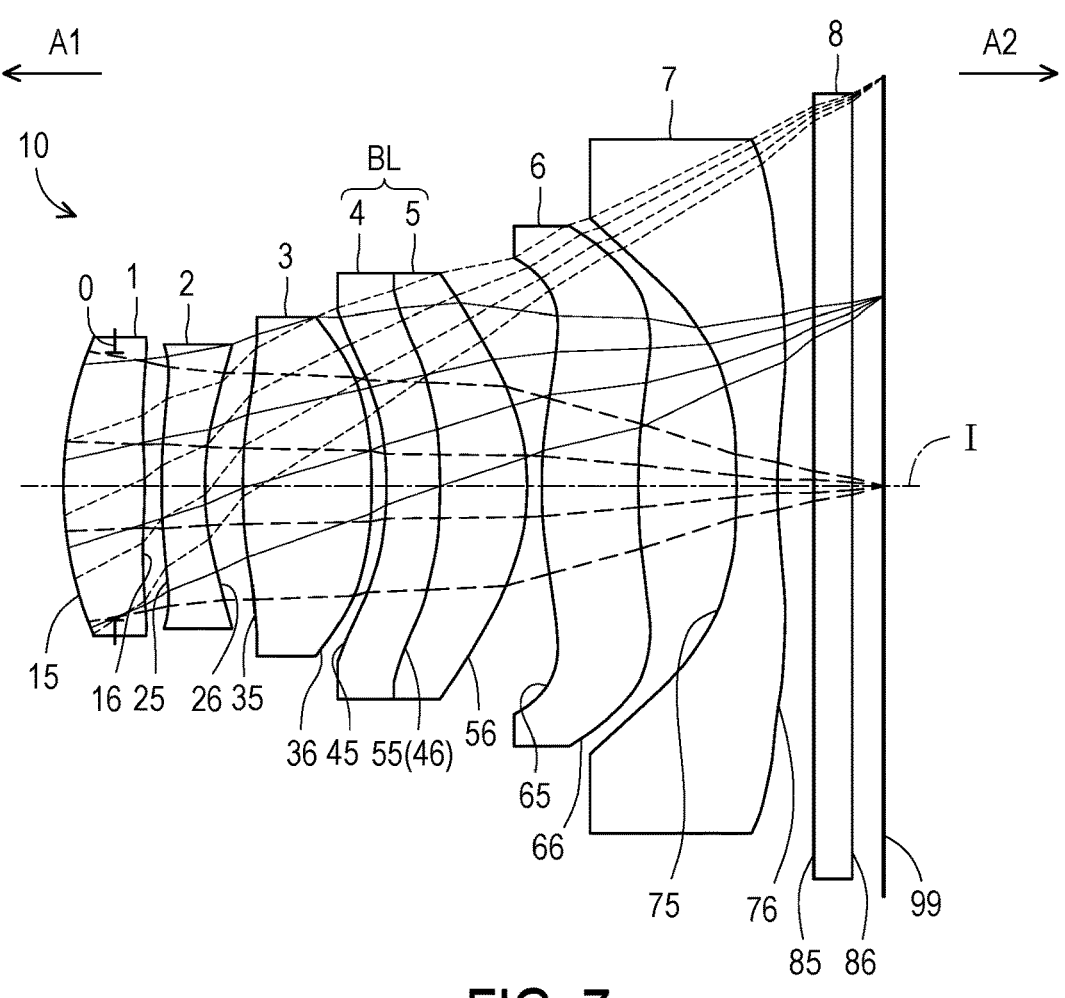
FIG. 7 is a schematic view illustrating an image capturing lens according to a fourth embodiment of the disclosure.

Please refer to FIG. 7, which schematically illustrates an image capturing lens according to a fourth embodiment of the disclosure. The image capturing lens 10 provided in the fourth embodiment of the disclosure sequentially includes an aperture 0, a first lens 1, a second lens 2, a third lens 3, a fourth lens 4, a fifth lens 5, a sixth lens 6, a seventh lens 7, and a filter 8 along the optical axis I of the image capturing lens 10 from the object side A1 to the image side A2. When the light emitted by an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on the image plane 99. The fourth lens 4 and the fifth lens 5 are cemented together through the image side surface 46 of the fourth lens 4 and the object side surface 55 of the fifth lens 5, thus forming a cemented lens BL. In the present embodiment, the aperture 0 is set on the object side A1 of the first lens 1.

The first lens 1 has a positive refracting power, the optical axis region of the object side surface 15 of the first lens 1 has a convex surface, the optical axis region of the image side surface 16 of the first lens 1 has a convex surface, and both the object side surface 15 and the image side surface 16 are aspheric surfaces. The second lens 2 has a negative refracting power, the optical axis region of the object side surface 25 of the second lens 2 has a convex surface, the optical axis region of the image side surface 26 of the second lens 2 has a concave surface, and both the object side surface 25 and the image side surface 26 are aspheric surfaces. The third lens 3 has a positive refracting power, the optical axis region of the object side surface 35 of the third lens 3 has a convex surface, the optical axis region of the image side surface 36 of the third lens 3 has a convex surface, and both the object side surface 35 and the image side surface 36 are aspheric surfaces. The fourth lens 4 has a negative refracting power, and the optical axis region of the object side surface 45 of the fourth lens 4 has a concave surface, which is an aspheric surface. The fifth lens 5 has a positive refracting power, the optical axis region of the object side surface 55 of the fifth lens 5 has a concave surface, the optical axis region of the image side surface 56 of the fifth lens 5 has a convex surface, and both the object side surface 55 and the image side surface 56 are aspheric surfaces. The sixth lens 6 has a positive refracting power, the optical axis region of the object side surface 65 of the sixth lens 6 has a convex surface, the optical axis region of the image side surface 66 of the sixth lens 6 has a concave surface, and both the object side surface 65 and the image side surface 66 are aspheric surfaces. The seventh lens 7 has a negative refracting power, the optical axis region of the object side surface 75 of the seventh lens 7 has a concave surface, the optical axis region of the image side surface 76 of the seventh lens 7 has a concave surface, and both the object side surface 75 and the image side surface 76 are aspheric surfaces. The cemented lens BL may have a positive or negative refracting power. The Abbe number of the fourth lens 4 falls within a range of 18 to 28, and the refractive index Nd of the fourth lens 4 falls within a range of 1.6 to 1.95.

Other detailed optical data provided in the fourth embodiment are shown in Table 7. The FOV of the optical image capturing lens 10 is 380 and the f-stop (F number) is 1.87, which satisfies a conditional expression as follows:

$$\frac{TTL}{2ImgH} = 0.995$$

where TTL is the distance from the object side surface 15 of the first lens 1 to the image plane 99 on the optical axis I, and ImgH is half the length of the diagonal of the effective pixel region on the image plane 99.

TABLE 7

| Element | Surface | Curvature radius (mm) | Pitch (mm) | Refractive index | Abbe number |
|---|---|---|---|---|---|
| First lens 1 | Object side surface 15 | 2.847 | 0.475 | 1.59 | 30.9 |
| | Image side surface 16 | −9.870 | 0.107 | | |
| Second lens 2 | Object side surface 25 | 3.393 | 0.257 | 1.66 | 20.4 |
| | Image side surface 26 | 1.404 | 0.229 | | |
| Third lens 3 | Object side surface 35 | 5.418 | 0.760 | 1.49 | 57.4 |
| | Image side surface 36 | −2.898 | 0.093 | | |
| Fourth lens 4 | Object side surface 45 | −2.375 | 0.315 | 1.66 | 20.4 |
| Fifth lens 5 | Object side surface 55 | −3.557 | 0.521 | 1.49 | 57.4 |
| | Image side surface 56 | −1.878 | 0.080 | | |
| Sixth lens 6 | Object side surface 65 | 2.349 | 0.575 | 1.59 | 30.9 |
| | Image side surface 66 | 3.628 | 0.593 | | |

TABLE 7-continued

| Element | Surface | Curvature radius (mm) | Pitch (mm) | Refractive index | Abbe number |
|---|---|---|---|---|---|
| Seventh lens 7 | Object side surface 75 | −2.967 | 0.240 | 1.59 | 30.9 |
| | Image side surface 76 | 3.056 | 0.214 | | |
| Filter 8 | Object side surface 85 | infinite | 0.230 | 1.52 | 64.2 |
| | Image side surface 86 | infinite | 0.180 | | |
| | Image plane 99 | infinite | 0.00 | | |

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens 6, and the seventh lens 7 are all aspheric surfaces, and these aspheric surfaces are defined by the above-mentioned formula (1).

In the present embodiment, the conic coefficient K and various aspheric coefficients of the above-mentioned aspheric surface in the formula (1) are as shown in Table 8. In Table 8, the column numbered as 15 indicates that it refers to the aspheric coefficient of the object side surface 15 of the first lens 1, and the rest may be deduced therefrom for other numbered columns.

TABLE 8

| Surface | K | $a_2$ | $a_4$ | $a_6$ | $a_8$ |
|---|---|---|---|---|---|
| 15 | 2.408 | 0.00E+00 | 1.73E−02 | 1.34E−01 | −2.60E−01 |
| 16 | 0.000 | 0.00E+00 | 2.05E−01 | −2.44E−01 | 5.72E−01 |
| 25 | 6.513 | 0.00E+00 | −1.77E−01 | 3.34E−01 | −9.51E−01 |
| 26 | −4.461 | 0.00E+00 | −1.42E−01 | 2.21E−01 | −2.68E−01 |
| 35 | 0.000 | 9.05E−02 | −1.41E−01 | 1.91E−01 | −4.50E−01 |
| 36 | −15.798 | 0.00E+00 | −2.59E−01 | 1.37E−02 | 6.65E−02 |
| 45 | 0.000 | −6.28E−02 | −1.18E−01 | 2.10E−01 | −3.61E−01 |
| 55 | 0.000 | 0.00E+00 | −3.04E−01 | 3.74E−01 | −1.20E−01 |
| 56 | 0.000 | −1.12E−01 | 3.06E−02 | 2.27E−02 | 1.04E−02 |
| 65 | −10.748 | 0.00E+00 | −4.38E−02 | −2.72E−02 | 1.09E−03 |
| 66 | −8.043 | 4.61E−02 | −8.36E−02 | −4.25E−02 | 1.69E−02 |
| 75 | 0.000 | 0.00E+00 | −1.13E−01 | 1.11E−02 | −1.17E−02 |
| 76 | −10.606 | −2.09E−02 | −1.15E−01 | 4.44E−02 | −6.34E−03 |

| Surface | $a_{10}$ | $a_{12}$ | $a_{14}$ | $a_{16}$ | $a_{18}$ |
|---|---|---|---|---|---|
| 15 | 2.35E−01 | 3.34E−02 | −6.92E−02 | −1.66E−01 | 1.26E−01 |
| 16 | −1.05E+00 | 5.04E−01 | 3.71E−02 | 1.33E+00 | −1.97E+00 |
| 25 | 6.56E−01 | −5.28E−02 | 6.68E−01 | −1.53E+00 | 0.00E+00 |
| 26 | 4.72E−02 | −3.33E−02 | 2.46E−01 | −1.84E−01 | 0.00E+00 |
| 35 | 5.40E−01 | −3.36E−01 | 6.56E−02 | 4.09E−02 | 3.09E−02 |
| 36 | −1.11E−01 | 2.38E−01 | −2.44E−01 | 1.03E−01 | −1.28E−02 |
| 45 | 6.24E−01 | −5.33E−01 | 2.28E−01 | −4.35E−02 | 7.37E−04 |
| 55 | −1.44E−01 | 1.27E−01 | 2.39E−02 | −4.72E−02 | 1.12E−02 |
| 56 | −1.28E−02 | 2.61E−03 | 1.42E−03 | −7.13E−04 | −3.72E−04 |
| 65 | −1.61E−03 | 2.64E−03 | −1.33E−03 | −8.92E−04 | −2.08E−04 |
| 66 | −4.45E−03 | −7.02E−04 | 2.91E−04 | 3.92E−05 | 3.58E−05 |
| 75 | 8.88E−03 | −7.05E−04 | 1.94E−06 | −5.41E−05 | −2.94E−05 |
| 76 | −2.70E−04 | 2.41E−04 | −3.88E−05 | 7.34E−07 | −4.67E−08 |

| Surface | $a_{20}$ |
|---|---|
| 15 | 0.00E+00 |
| 16 | 0.00E+00 |
| 25 | 0.00E+00 |
| 26 | 0.00E+00 |
| 35 | −3.48E−02 |
| 36 | 1.73E−03 |
| 45 | 0.00E+00 |
| 55 | −3.78E−04 |
| 56 | 1.90E−04 |
| 65 | 1.66E−04 |
| 66 | −1.29E−05 |
| 75 | 7.93E−06 |
| 76 | 6.60E−08 |

Figure 8A:
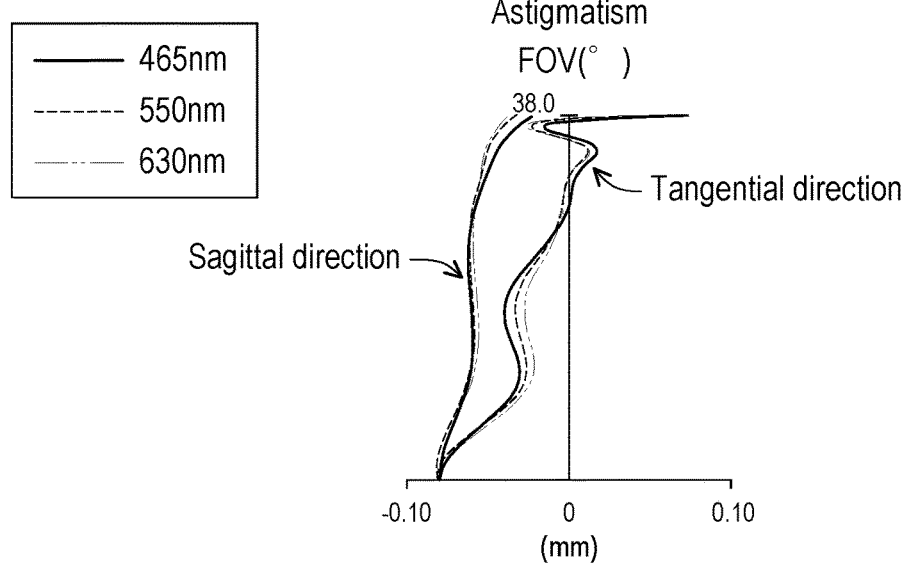
FIG. 8A is a schematic view illustrating astigmatism of the image capturing lens according to the fourth embodiment.
Figure 8B:
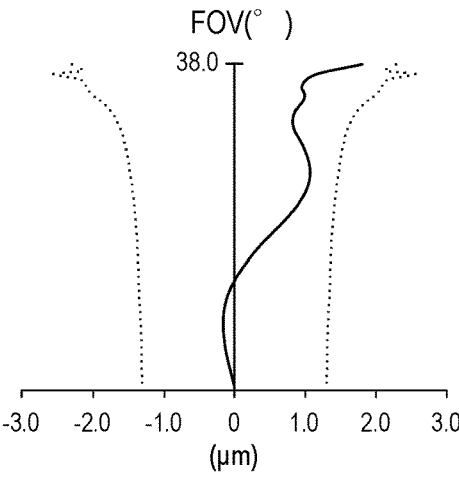
FIG. 8B is a schematic view illustrating vertical chromatic aberration of the image capturing lens according to the fourth embodiment.
Figure 8C:
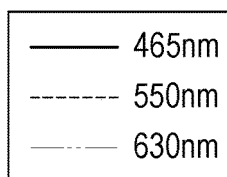
FIG. 8C is a schematic view illustrating axial aberration of the image capturing lens according to the fourth embodiment.
Figure 8C:
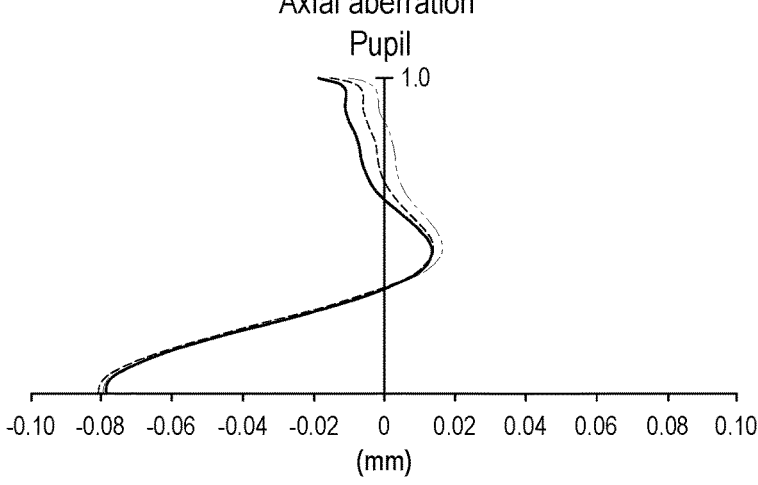
Figure 8D:
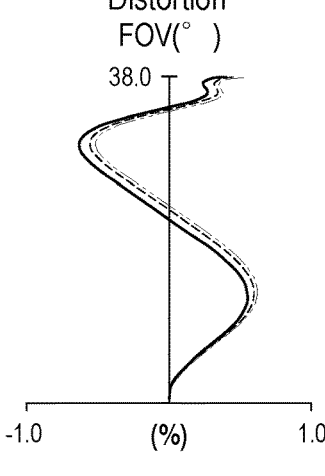
FIG. 8D is a schematic view illustrating distortion of the image capturing lens according to the fourth embodiment.

Please refer to FIG. 8A to FIG. 8D. FIG. 8A is a schematic view illustrating astigmatism of the image capturing lens according to the fourth embodiment, FIG. 8B is a schematic view illustrating vertical chromatic aberration of the image capturing lens according to the fourth embodiment, FIG. 8C is a schematic view illustrating axial aberration of the image capturing lens according to the fourth embodiment, and FIG. 8D is a schematic view illustrating distortion of the image capturing lens according to the fourth embodiment.

As shown in FIG. 8A, when different color beams with wavelengths of 465 nm, 550 nm, and 630 nm respectively are incident to the image capturing lens 10, the astigmatism of each color beam at different FOV falls within a range of ±0.10 mm. With reference to FIG. 8B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 8B, which schematically illustrates the vertical chromatic aberration, it may be learned that the vertical chromatic aberration of the image capturing lens 10 at different FOVs falls within a range of a diffraction limit (shown as the dotted line in FIG. 8B), and falls within a range of ±3.0 μm. With reference to FIG. 8C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.10 mm. The distortion aberration diagram in FIG. 8D shows that the distortion aberration of the image capturing lens 10 remains within a range of ±1%. Through FIG. 8A to FIG. 8D, it is demonstrated that the image capturing lens 10 provided in the fourth embodiment has good imaging quality.

Figure 9:
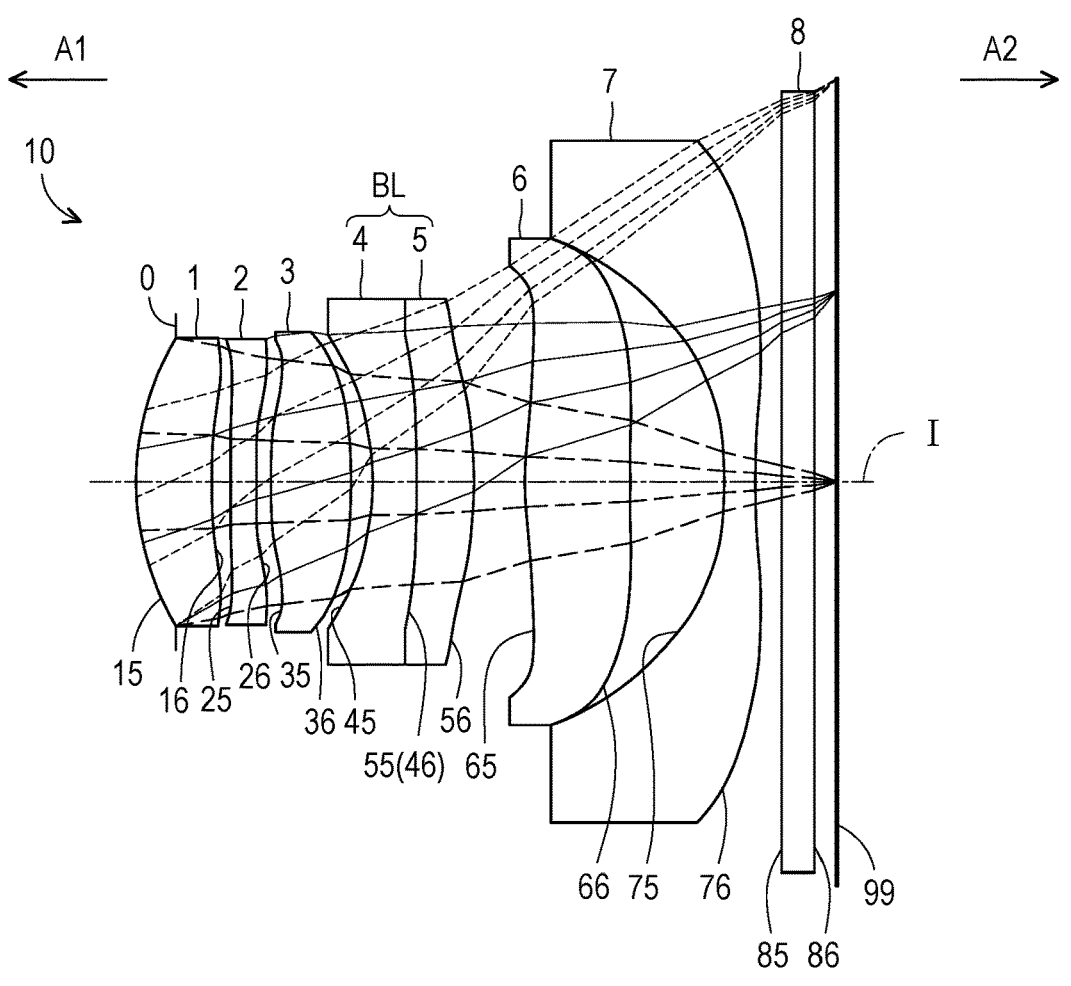
FIG. 9 is a schematic view illustrating an image capturing lens according to a fifth embodiment of the disclosure.

Please refer to FIG. 9, which schematically illustrates an image capturing lens according to a fifth embodiment of the disclosure. The image capturing lens 10 provided in the fifth embodiment of the disclosure sequentially includes an aperture 0, a first lens 1, a second lens 2, a third lens 3, a fourth lens 4, a fifth lens 5, a sixth lens 6, a seventh lens 7, and a filter 8 along the optical axis I of the image capturing lens 10 from the object side A1 to the image side A2. When the light emitted by an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on the image plane 99. The fourth lens 4 and the fifth lens 5 are cemented together through the image side surface 46 of the fourth lens 4 and the object side surface 55 of the fifth lens 5, thus forming a cemented lens BL. In the present embodiment, the aperture 0 is set on the object side A1 of the first lens 1.

The first lens 1 has a positive refracting power, the optical axis region of the object side surface 15 of the first lens 1 has a convex surface, the optical axis region of the image side surface 16 of the first lens 1 has a concave surface, and both the object side surface 15 and the image side surface 16 are aspheric surfaces. The second lens 2 has a negative refracting power, the optical axis region of the object side surface 25 of the second lens 2 has a convex surface, the optical axis region of the image side surface 26 of the second lens 2 has a concave surface, and both the object side surface 25 and the image side surface 26 are aspheric surfaces. The third lens 3 has a positive refracting power, the optical axis region of the object side surface 35 of the third lens 3 has a convex surface, the optical axis region of the image side surface 36 of the third lens 3 has a convex surface, and both the object side surface 35 and the image side surface 36 are aspheric surfaces. The fourth lens 4 has a negative refracting power, and the optical axis region of the object side surface 45 of the fourth lens 4 has a concave surface, which is an aspheric surface. The fifth lens 5 has a positive refracting power, the optical axis region of the object side surface 55 of the fifth lens 5 has a convex surface, the optical axis region of the image side surface 56 of the fifth lens 5 has a convex surface, and both the object side surface 55 and the image side surface 56 are aspheric surfaces. The sixth lens 6 has a positive refracting power, the optical axis region of the object side surface 65 of the sixth lens 6 has a convex surface, the optical axis region of the image side surface 66 of the sixth lens 6 has a concave surface, and both the object side surface 65 and the image side surface 66 are aspheric surfaces. The seventh lens 7 has a negative refracting power, the optical axis region of the object side surface 75 of the seventh lens 7 has a concave surface, the optical axis region of the image side surface 76 of the seventh lens 7 has a concave surface, and both the object side surface 75 and the image side surface 76 are aspheric surfaces. The cemented lens BL may have a positive or negative refracting power. The Abbe number of the fourth lens 4 falls within a range of 18 to 28, and the refractive index Nd of the fourth lens 4 falls within a range of 1.6 to 1.95.

Other detailed optical data provided in the fifth embodiment are shown in Table 9. The FOV of the optical image capturing lens 10 is 380 and the f-stop (F number) is 1.8, which satisfies a conditional expression as follows:

$$\frac{TTL}{2ImgH} = 0.862$$

where TTL is the distance from the object side surface 15 of the first lens 1 to the image plane 99 on the optical axis I, and ImgH is half the length of the diagonal of the effective pixel region on the image plane 99.

TABLE 9

| Element | Surface | Curvature radius (mm) | Pitch (mm) | Refractive index | Abbe number |
|---------|---------|----------------------|------------|------------------|-------------|
| First lens 1 | Object side surface 15 | 1.998 | 0.563 | 1.59 | 30.9 |
| | Image side surface 16 | 4.686 | 0.134 | | |
| Second lens 2 | Object side surface 25 | 7.329 | 0.189 | 1.64 | 22.4 |
| | Image side surface 26 | 2.671 | 0.106 | | |
| Third lens 3 | Object side surface 35 | 2.367 | 0.605 | 1.55 | 55 |
| | Image side surface 36 | −8.378 | 0.159 | | |
| Fourth lens 4 | Object side surface 45 | −2.681 | 0.339 | 1.64 | 20 |
| Fifth lens 5 | Object side surface 55 | 38.695 | 0.428 | 1.6 | 61 |
| | Image side surface 56 | −5.448 | 0.405 | | |
| Sixth lens 6 | Object side surface 65 | 3.706 | 0.790 | 1.69 | 24.1 |
| | Image side surface 66 | 99.254 | 0.706 | | |

TABLE 9-continued

| Element | Surface | Curvature radius (mm) | Pitch (mm) | Refractive index | Abbe number |
|---------|---------|----------------------|-----------|------------------|-------------|
| Seventh lens 7 | Object side surface 75 | −3.344 | 0.228 | 1.54 | 55.9 |
| | Image side surface 76 | 3.621 | 0.218 | | |
| Filter 8 | Object side surface 85 | infinite | 0.230 | 1.52 | 64.2 |
| | Image side surface 86 | infinite | 0.180 | | |
| | Image plane 99 | infinite | 0.00 | | |

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens 6, and the seventh lens 7 are all aspheric surfaces, and these aspheric surfaces are defined by the above-mentioned formula (1).

In the present embodiment, the conic coefficient K and various aspheric coefficients of the above-mentioned aspheric surface in the formula (1) are as shown in Table 10. In Table 10, the column numbered as 15 indicates that it refers to the aspheric coefficient of the object side surface 15 of the first lens 1, and the rest may be deduced therefrom for other numbered columns.

TABLE 10

| Surface | K | $a_2$ | $a_4$ | $a_6$ | $a_8$ |
|---------|-----|-------|-------|-------|-------|
| 15 | 0.117 | 0.00E+00 | 1.90E−03 | 2.06E−02 | −8.55E−02 |
| 16 | −9.795 | 0.00E+00 | 3.38E−03 | −1.34E−01 | 4.01E−01 |
| 25 | −18.542 | 0.00E+00 | −1.35E−01 | 1.63E−01 | −4.09E−01 |
| 26 | 0.749 | 0.00E+00 | −2.10E−01 | 1.82E−01 | −2.27E−01 |
| 35 | −0.027 | 0.00E+00 | −1.47E−01 | 1.41E−01 | −3.90E−01 |
| 36 | −38.096 | 0.00E+00 | −1.35E−01 | −9.13E−04 | −1.87E−02 |
| 45 | −8.250 | 0.00E+00 | −2.16E−01 | 2.10E−01 | −3.88E−01 |
| 55 | 100.000 | 0.00E+00 | −2.48E−01 | 2.65E−01 | −6.35E−02 |
| 56 | 4.100 | 0.00E+00 | −9.33E−02 | 6.85E−02 | 1.07E−02 |
| 65 | 1.127 | 0.00E+00 | −9.25E−02 | 1.51E−02 | 6.93E−03 |
| 66 | 419.079 | 0.00E+00 | −2.18E−02 | −2.63E−02 | 1.33E−02 |
| 75 | 1.051 | 0.00E+00 | −1.44E−01 | 4.59E−02 | −1.12E−02 |
| 76 | −2.516 | 0.00E+00 | −1.21E−01 | 4.29E−02 | −6.78E−03 |

| Surface | $a_{10}$ | $a_{12}$ | $a_{14}$ | $a_{16}$ | $a_{18}$ |
|---------|----------|----------|----------|----------|----------|
| 15 | 1.33E−01 | −8.75E−02 | 3.46E−03 | 1.77E−02 | 0.00E+00 |
| 16 | −8.07E−01 | 8.25E−01 | −3.58E−01 | −1.52E−02 | 0.00E+00 |
| 25 | 6.68E−01 | −6.04E−01 | 2.94E−01 | −6.80E−02 | 0.00E+00 |
| 26 | 2.37E−01 | −1.04E−01 | −5.45E−03 | 5.53E−03 | 0.00E+00 |
| 35 | 5.09E−01 | −3.55E−01 | 6.53E−02 | 2.20E−02 | 2.21E−04 |
| 36 | −9.88E−02 | 2.60E−01 | −2.42E−01 | 9.11E−02 | 5.01E−05 |
| 45 | 6.15E−01 | −5.32E−01 | 2.34E−01 | −4.10E−02 | 4.70E−04 |
| 55 | −1.38E−01 | 1.14E−01 | 1.73E−02 | −4.75E−02 | 3.03E−04 |
| 56 | −1.68E−02 | 5.52E−04 | 1.65E−03 | −1.98E−05 | 4.26E−06 |
| 65 | −6.99E−03 | 2.22E−03 | −1.75E−04 | −9.30E−05 | 6.64E−07 |
| 66 | −2.19E−03 | −1.56E−04 | 1.67E−04 | −7.42E−05 | −1.48E−08 |
| 75 | 5.77E−03 | −1.52E−03 | 4.39E−06 | 2.27E−05 | 4.79E−08 |
| 76 | −2.67E−04 | 2.53E−04 | −3.40E−05 | 1.68E−06 | 4.72E−11 |

| Surface | $a_{20}$ | $a_{22}$ | $a_{24}$ |
|---------|----------|----------|----------|
| 15 | 0.00E+00 | 0.00E+00 | 0.00E+00 |
| 16 | 0.00E+00 | 0.00E+00 | 0.00E+00 |
| 25 | 0.00E+00 | 0.00E+00 | 0.00E+00 |
| 26 | 0.00E+00 | 0.00E+00 | 0.00E+00 |
| 35 | 1.65E−03 | 0.00E+00 | 0.00E+00 |
| 36 | −5.01E−04 | 0.00E+00 | 0.00E+00 |
| 45 | −9.05E−04 | 0.00E+00 | 0.00E+00 |
| 55 | −4.73E−04 | 0.00E+00 | 0.00E+00 |
| 56 | 3.79E−06 | 0.00E+00 | 0.00E+00 |
| 65 | −1.54E−07 | 0.00E+00 | 0.00E+00 |
| 66 | −3.75E−08 | 0.00E+00 | 0.00E+00 |
| 75 | 6.46E−09 | 1.11E−10 | 3.50E−11 |
| 76 | −8.05E−12 | −5.77E−14 | −1.35E−14 |

Figure 10A:
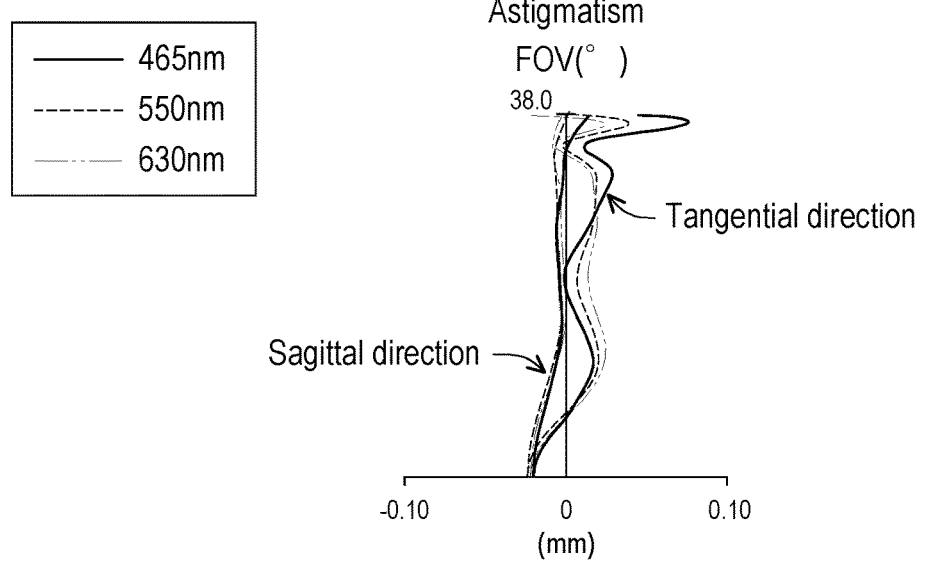
FIG. 10A is a schematic view illustrating astigmatism of the image capturing lens according to the fifth embodiment.
Figure 10B:
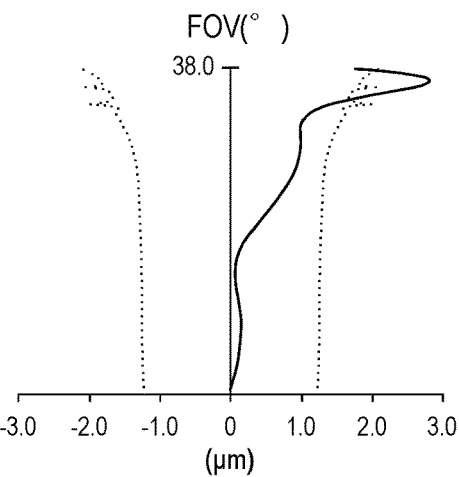
FIG. 10B is a schematic view illustrating vertical chromatic aberration of the image capturing lens according to the fifth embodiment.
Figure 10C:
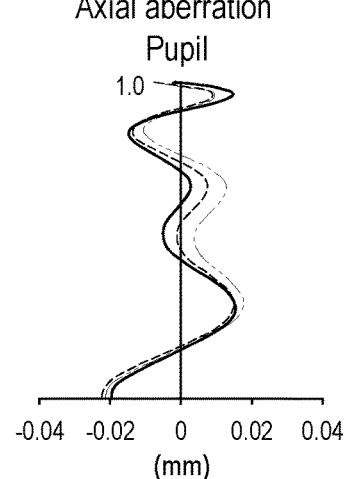
FIG. 10C is a schematic view illustrating axial aberration of the image capturing lens according to the fifth embodiment.
Figure 10D:
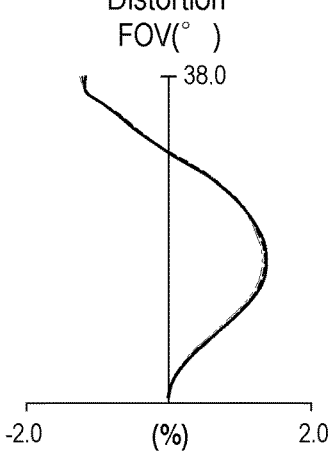
FIG. 10D is a schematic view illustrating distortion of the image capturing lens according to the fifth embodiment.

Please refer to FIG. 10A to FIG. 10D. FIG. 10A is a schematic view illustrating astigmatism of the image capturing lens according to the fifth embodiment, FIG. 10B is a schematic view illustrating vertical chromatic aberration of the image capturing lens according to the fifth embodiment, FIG. 10C is a schematic view illustrating axial aberration of the image capturing lens according to the fifth embodiment, and FIG. 10D is a schematic view illustrating distortion of the image capturing lens according to the fifth embodiment.

As shown in FIG. 10A, when different color beams with wavelengths of 465 nm, 550 nm, and 630 nm respectively are incident to the image capturing lens 10, the astigmatism of each color beam at different FOV falls within a range of ±0.10 mm. With reference to FIG. 10B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 10B, which schematically illustrates the vertical chromatic aberration, it may be learned that the vertical chromatic aberration of the image capturing lens 10 at different FOVs falls within a range of a diffraction limit (shown as the dotted line in FIG. 10B), and falls within a range of ±3.0 μm. With reference to FIG. 10C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.04 mm. The distortion aberration diagram in FIG. 10D shows that the distortion aberration of the image capturing lens 10 remains within a range of ±2%. Through FIG. 10A to FIG. 10D, it is demonstrated that the image capturing lens 10 provided in the fifth embodiment has good imaging quality.

Figure 11:
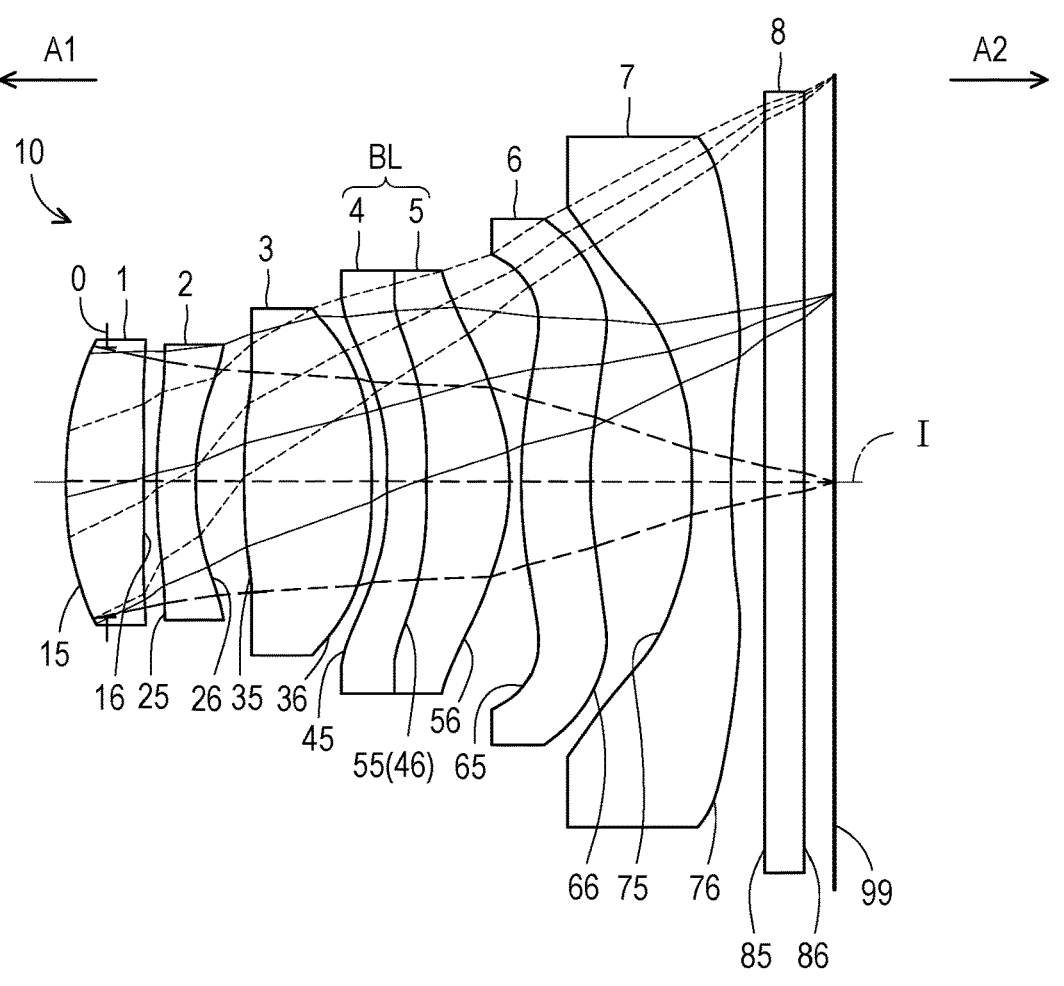
FIG. 11 is a schematic view illustrating an image capturing lens according to a sixth embodiment of the disclosure.

Please refer to FIG. 11, which schematically illustrates an image capturing lens according to a sixth embodiment of the disclosure. The image capturing lens 10 provided in the sixth embodiment of the disclosure sequentially includes an aperture 0, a first lens 1, a second lens 2, a third lens 3, a fourth lens 4, a fifth lens 5, a sixth lens 6, a seventh lens 7, and a filter 8 along the optical axis I of the image capturing lens 10 from the object side A1 to the image side A2. When the light emitted by an object to be shot enters the image capturing lens 10 and sequentially passes through the aperture 0, the first lens 1, the second lens 2, the third lens 3, the fourth lens 4, the fifth lens 5, the sixth lens 6, the seventh lens 7, and the filter 8, an image is generated on the image plane 99. The fourth lens 4 and the fifth lens 5 are cemented together through the image side surface 46 of the fourth lens 4 and the object side surface 55 of the fifth lens 5, thus forming a cemented lens BL. In the present embodiment, the aperture 0 is set on the object side A1 of the first lens 1.

The first lens 1 has a positive refracting power, the optical axis region of the object side surface 15 of the first lens 1 has a convex surface, the optical axis region of the image side surface 16 of the first lens 1 has a convex surface, and both the object side surface 15 and the image side surface 16 are aspheric surfaces. The second lens 2 has a negative refracting power, the optical axis region of the object side surface 25 of the second lens 2 has a convex surface, the optical axis region of the image side surface 26 of the second lens 2 has a concave surface, and both the object side surface 25 and the image side surface 26 are aspheric surfaces. The third lens 3 has a positive refracting power, the optical axis region of the object side surface 35 of the third lens 3 has a convex surface, the optical axis region of the image side surface 36 of the third lens 3 has a convex surface, and both the object side surface 35 and the image side surface 36 are aspheric surfaces. The fourth lens 4 has a negative refracting power, and the optical axis region of the object side surface 45 of the fourth lens 4 has a concave surface, which is an aspheric surface. The fifth lens 5 has a positive refracting power, the optical axis region of the object side surface 55 of the fifth lens 5 has a concave surface, the optical axis region of the image side surface 56 of the fifth lens 5 has a convex surface, and both the object side surface 55 and the image side surface 56 are aspheric surfaces. The sixth lens 6 has a positive refracting power, the optical axis region of the object side surface 65 of the sixth lens 6 has a convex surface, the optical axis region of the image side surface 66 of the sixth lens 6 has a concave surface, and both the object side surface 65 and the image side surface 66 are aspheric surfaces. The seventh lens 7 has a negative refracting power, the optical axis region of the object side surface 75 of the seventh lens 7 has a concave surface, the optical axis region of the image side surface 76 of the seventh lens 7 has a concave surface, and both the object side surface 75 and the image side surface 76 are aspheric surfaces. The cemented lens BL may have a positive or negative refracting power. The Abbe number of the fourth lens 4 falls within a range of 18 to 28, and the refractive index Nd of the fourth lens 4 falls within a range of 1.6 to 1.95.

Other detailed optical data provided in the sixth embodiment are shown in Table 11. The FOV of the optical image capturing lens 10 is 380 and the f-stop (F number) is 1.87, which satisfies a conditional expression as follows:

$$\frac{TTL}{2ImgH} = 0.94$$

where TTL is the distance from the object side surface 15 of the first lens 1 to the image plane 99 on the optical axis I, and ImgH is half the length of the diagonal of the effective pixel region on the image plane 99.

TABLE 11

| Element | Surface | Curvature radius (mm) | Pitch (mm) | Refractive index | Abbe number |
|---|---|---|---|---|---|
| First lens 1 | Object side surface 15 | 2.346 | 0.471 | 1.61 | 51.4 |
| | Image side surface 16 | −12.025 | 0.073 | | |
| Second lens 2 | Object side surface 25 | 3.147 | 0.233 | 1.67 | 31.3 |
| | Image side surface 26 | 1.409 | 0.294 | | |
| Third lens 3 | Object side surface 35 | 7.051 | 0.756 | 1.53 | 63.2 |
| | Image side surface 36 | −3.540 | 0.096 | | |
| Fourth lens 4 | Object side surface 45 | −2.442 | 0.234 | 1.67 | 19.2 |
| Fifth lens 5 | Object side surface 55 | −3.886 | 0.494 | 1.6 | 60 |
| | Image side surface 56 | −1.967 | 0.070 | | |
| Sixth lens 6 | Object side surface 65 | 2.440 | 0.413 | 1.57 | 56 |
| | Image side surface 66 | 3.421 | 0.607 | | |

TABLE 11-continued

| Element | Surface | Curvature radius (mm) | Pitch (mm) | Refractive index | Abbe number |
|---|---|---|---|---|---|
| Seventh lens 7 | Object side surface 75 | −2.975 | 0.232 | 1.57 | 56 |
| | Image side surface 76 | 2.923 | 0.206 | | |
| Filter 8 | Object side surface 85 | infinite | 0.230 | 1.52 | 64.2 |
| | Image side surface 86 | infinite | 0.180 | | |
| | Image plane 99 | infinite | 0.00 | | |

In the present embodiment, the object side surfaces 15, 25, 35, 45, 55, 65, and 75 and image side surfaces 16, 26, 36, 46, 56, 66, and 76 of the first lens 1, the second lens 2, the third lens 3, the fourth lens 4, the fifth lens 5, the sixth lens 6, and the seventh lens 7 are all aspheric surfaces, and these aspheric surfaces are defined by the above-mentioned formula (1).

In the present embodiment, the conic coefficient K and various aspheric coefficients of the above-mentioned aspheric surface in the formula (1) are as shown in Table 12. In Table 12, the column numbered as 15 indicates that it refers to the aspheric coefficient of the object side surface 15 of the first lens 1, and the rest may be deduced therefrom for other numbered columns.

TABLE 12

| Surface | K | $a_2$ | $a_4$ | $a_6$ | $a_8$ |
|---|---|---|---|---|---|
| 15 | 1.873 | 0.00E+00 | 1.02E−02 | 8.58E−02 | −2.19E−01 |
| 16 | 0.000 | 0.00E+00 | 1.77E−01 | −2.26E−01 | 5.66E−01 |
| 25 | 7.269 | 0.00E+00 | −1.72E−01 | 3.07E−01 | −8.66E−01 |
| 26 | −4.305 | 0.00E+00 | −1.17E−01 | 2.38E−01 | −2.80E−01 |
| 35 | 0.000 | 5.84E−02 | −1.27E−01 | 1.66E−01 | −4.50E−01 |
| 36 | −10.814 | 0.00E+00 | −2.59E−01 | 9.16E−03 | 6.21E−02 |
| 45 | 0.000 | −5.78E−02 | −1.08E−01 | 2.12E−01 | −3.62E−01 |
| 55 | −18.495 | 0.00E+00 | −2.84E−01 | 3.74E−01 | −1.68E−01 |
| 56 | 0.000 | −1.12E−01 | 5.96E−02 | 2.35E−02 | 8.82E−03 |
| 65 | −4.858 | 0.00E+00 | −5.53E−02 | −2.92E−02 | −7.76E−04 |
| 66 | −1.947 | 5.57E−02 | −8.85E−02 | −4.10E−02 | 1.61E−02 |
| 75 | 0.000 | 0.00E+00 | −1.13E−01 | 2.25E−02 | −9.63E−03 |
| 76 | −13.162 | −1.60E−02 | −1.11E−01 | 4.34E−02 | −6.70E−03 |

| Surface | $a_{10}$ | $a_{12}$ | $a_{14}$ | $a_{16}$ | $a_{18}$ |
|---|---|---|---|---|---|
| 15 | 2.83E−01 | −1.50E−03 | −1.56E−01 | −1.54E−01 | 1.88E−01 |
| 16 | −1.04E+00 | 5.27E−01 | −1.73E−02 | 1.07E+00 | −1.57E+00 |
| 25 | 7.03E−01 | −2.29E−01 | 4.24E−01 | −1.39E+00 | 4.82E−01 |
| 26 | 5.07E−02 | −2.67E−02 | 2.08E−01 | −2.11E−01 | 8.44E−02 |
| 35 | 5.46E−01 | −3.36E−01 | 6.30E−02 | 4.07E−02 | 3.34E−02 |
| 36 | −1.11E−01 | 2.39E−01 | −2.44E−01 | 0.00E+00 | −1.34E−02 |
| 45 | 6.23E−01 | 0.00E+00 | 2.27E−01 | −4.35E−02 | 9.83E−04 |
| 55 | −9.87E−02 | 1.14E−01 | 2.70E−02 | 0.00E+00 | 0.00E+00 |
| 56 | −1.40E−02 | 3.14E−03 | 1.74E−03 | −5.56E−04 | −3.42E−04 |
| 65 | −3.05E−03 | 2.98E−03 | −6.91E−04 | −6.29E−04 | −2.44E−04 |
| 66 | −2.51E−03 | 0.00E+00 | 2.61E−04 | 3.47E−05 | 0.00E+00 |
| 75 | 8.99E−03 | −8.28E−04 | −8.57E−05 | −8.99E−05 | −3.75E−05 |
| 76 | −2.73E−04 | 2.50E−04 | −3.64E−05 | 9.30E−07 | −1.03E−07 |

| Surface | $a_{20}$ |
|---|---|
| 15 | 0.00E+00 |
| 16 | 0.00E+00 |
| 25 | 0.00E+00 |
| 26 | 0.00E+00 |
| 35 | −3.47E−02 |
| 36 | 4.51E−05 |
| 45 | 4.73E−04 |
| 55 | 0.00E+00 |
| 56 | 1.79E−04 |
| 65 | 5.74E−05 |
| 66 | −2.06E−05 |
| 75 | 0.00E+00 |
| 76 | 0.00E+00 |

Figure 12A:
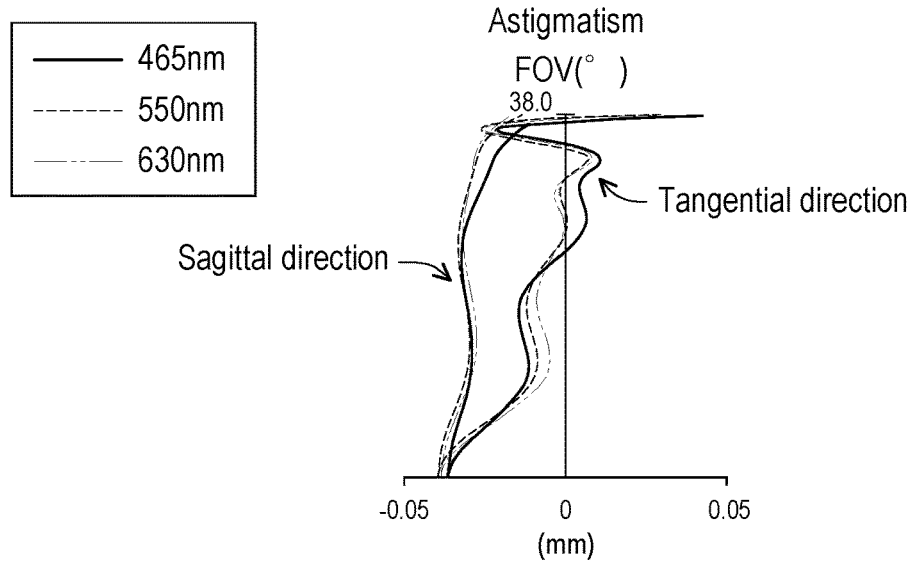
FIG. 12A is a schematic view illustrating astigmatism of the image capturing lens according to the sixth embodiment.
Figure 12B:
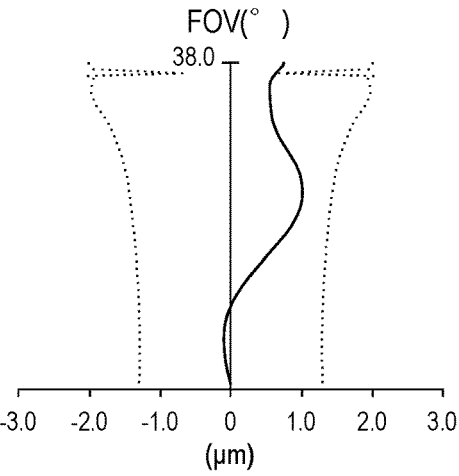
FIG. 12B is a schematic view illustrating vertical chromatic aberration of the image capturing lens according to the sixth embodiment.
Figure 12C:
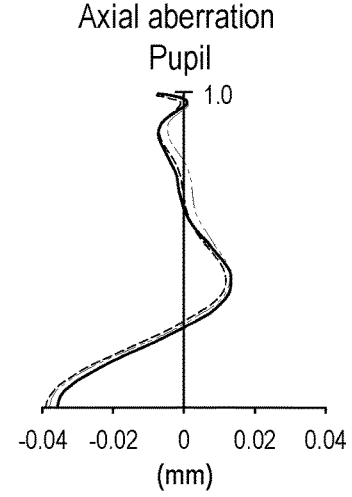
FIG. 12C is a schematic view illustrating axial aberration of the image capturing lens according to the sixth embodiment.
Figure 12D:
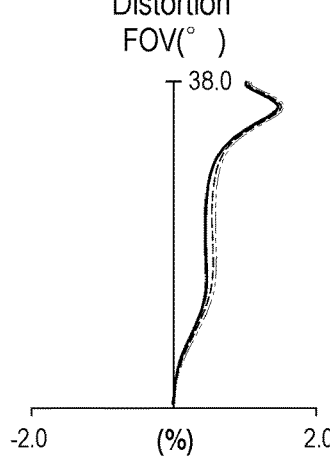
FIG. 12D is a schematic view illustrating distortion of the image capturing lens according to the sixth embodiment.

Please refer to FIG. 12A to FIG. 12D. FIG. 12A is a schematic view illustrating astigmatism of the image capturing lens according to the sixth embodiment, FIG. 12B is a schematic view illustrating vertical chromatic aberration of the image capturing lens according to the sixth embodiment, FIG. 12C is a schematic view illustrating axial aberration of the image capturing lens according to the sixth embodiment, and FIG. 12D is a schematic view illustrating distortion of the image capturing lens according to the sixth embodiment.

As shown in FIG. 12A, when different color beams with wavelengths of 465 nm, 550 nm, and 630 nm respectively are incident to the image capturing lens 10, the astigmatism of each color beam at different FOV falls within a range of ±0.05 mm. With reference to FIG. 12B, when different color beams with wavelengths of 465 nm, 550 nm, and 630 nm respectively are incident to the image capturing lens 10, on the image plane 99 perpendicular to the optical axis I, the position of the 550 nm color beam is taken as the reference zero, and the position differences of the 465 nm and 630 nm color beams are compared. As shown in FIG. 12B, which schematically illustrates the vertical chromatic aberration, it may be learned that the vertical chromatic aberration of the image capturing lens 10 at different FOVs falls within a range of a diffraction limit (shown as the dotted line in FIG. 12B), and falls within a range of ±2.0 μm. With reference to FIG. 12C, when different color beams with wavelengths of 465 nm, 550 nm, and 630 nm respectively are incident to the image capturing lens 10, the imaging position on the optical axis I varies with different aperture angles, thus generating the axial aberration, and the axial aberration of each color beam falls within the range of ±0.14 mm. The distortion aberration diagram in FIG. 12D shows that the distortion aberration of the image capturing lens 10 remains within a range of ±2%. Through FIG. 12A to FIG. 12D, it is demonstrated that the image capturing lens 10 provided in the sixth embodiment has good imaging quality.

The image capturing lens 10 provided in the previous embodiments satisfies a conditional expression as follows:

$$0.18 \le \frac{G34 + T4 + T5 + G56}{TTL} \le 0.28$$

where G34 refers to a gap on the optical axis I between the third lens 3 and the fourth lens 4, G56 refers to a gap on the optical axis I between the fifth lens 5 and the sixth lens 6, T4 refers to a thickness of the fourth lens 4 on the optical axis I, T5 refers to a thickness of the fifth lens 5 on the optical axis I, and TTL refers to a distance from the object side surface 15 of the first lens 1 to the image plane 99 of the first lens 1 on the optical axis I.

The image capturing lens 10 provided in the previous embodiments satisfies a conditional expression as follows:

$$1.48 \le \left| \frac{L1R1 + L1R2}{L1R1 - L1R2} \right| \le 5.35$$

where L1R1 refers to a curvature radius of the object side surface 15 of the first lens 1 in an optical axis region, and L1R2 refers to a curvature radius of the image side surface 16 of the first lens 1 in the optical axis region.

The image capturing lens 10 provided in the previous embodiments satisfies a conditional expression as follows:

$$0.3 \le \frac{T1 + G12 + T2 + G23 + T3 + G34}{TTL} \le 0.45$$

where T1 is a thickness of the first lens 1 on the optical axis I, T2 is a thickness of the second lens 2 on the optical axis I, T3 is a thickness of the third lens 3 on the optical axis I, G12 is a gap between the first lens 1 and the second lens 2 on the optical axis I, and G23 is a gap between the second lens 2 and the third lens 3 on the optical axis I.

The image capturing lens 10 provided in the previous embodiments satisfies a conditional expression as follows:

$$1.7 \le \left| \frac{L4R1 + L5R2}{L4R1 - L5R2} \right| \le 21.6$$

where L4R1 is a curvature radius of the object side surface 45 of the fourth lens 4 in the optical axis region, and L5R2 is a curvature radius of the image side surface 46 of the fifth lens 5 in the optical axis region.

The image capturing lens 10 provided in the previous embodiments satisfies a conditional expression as follows:

$$0.51 \le \left| \frac{L6R1 + L6R2}{L6R1 - L6R2} \right| \le 6$$

where L6R1 is a curvature radius of the object side surface 65 of the sixth lens 6 in the optical axis region, and L6R2 is a curvature radius of the image side surface 66 of the sixth lens 6 in the optical axis region.

In some embodiments of the disclosure, the image capturing lens 10 p satisfies a conditional expression as follows:

$$0.78 \le \frac{TTL}{2ImgH} \le 1.0$$

where ImgH is half the length of the diagonal of the effective pixel region on the image plane 99, and the f-number of the image capturing lens 10 falls within a range of 1.7 to 1.9.

To sum up, the image capturing lens provided in one or more embodiments of the disclosure includes the cemented lens formed by the fourth lens and the fifth lens, which may prevent the assembly tolerance between the two lenses caused by using discrete fourth and fifth lenses, and the image capturing lens may have good imaging quality.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An image capturing lens, sequentially comprising from an object side to an image side along an optical axis:
   a first lens, having a positive refracting power;
   a second lens, having a negative refracting power;
   a third lens, having a positive refracting power;
   a fourth lens, having a negative refracting power;

a fifth lens, having a positive refracting power, wherein the fourth lens and the fifth lens form a cemented lens;

a sixth lens, having a positive refracting power; and a seventh lens, having a negative refracting power, wherein the image capturing lens satisfies a conditional expression:

$$0.18 \le \frac{G34 + T4 + T5 + G56}{TTL} \le 0.28$$

wherein G34 is a gap between the third lens and the fourth lens on the optical axis, G56 is a gap between the fifth lens and the sixth lens on the optical axis, T4 is a thickness of the fourth lens on the optical axis, T5 is a thickness of the fifth lens on the optical axis, and TTL is a distance from an object side surface of the first lens to an image plane of the first lens on the optical axis, wherein the image capturing lens further satisfies a conditional expression:

$$0.51 \le \left| \frac{L6R1 + L6R2}{L6R1 - L6R2} \right| \le 6$$

wherein L6R1 is a curvature radius of an object side surface of the sixth lens in the optical axis region, and L6R2 is a curvature radius of an image side surface of the sixth lens in the optical axis region.

2. The image capturing lens according to claim 1, further satisfying a conditional expression:

$$1.48 \le \left| \frac{L1R1 + L1R2}{L1R1 - L1R2} \right| \le 5.35$$

wherein L1R1 is a curvature radius of the object side surface of the first lens in an optical axis region, and L1R2 is a curvature radius of an image side surface of the first lens in the optical axis region.

3. The image capturing lens according to claim 1, further satisfying a conditional expression:

$$0.3 \le \frac{T1 + G12 + T2 + G23 + T3 + G34}{TTL} \le 0.45$$

wherein T1 is a thickness of the first lens on the optical axis, T2 is a thickness of the second lens on the optical axis, T3 is a thickness of the third lens on the optical axis, G12 is a gap between the first lens and the second lens on the optical axis, and G23 is a gap between the second lens and the third lens on the optical axis.

4. The image capturing lens according to claim 1, further satisfying a conditional expression:

$$1.7 \le \left| \frac{L4R1 + L5R2}{L4R1 - L5R2} \right| \le 21.6$$

wherein L4R1 is a curvature radius of an object side surface of the fourth lens in the optical axis region, and L5R2 is a curvature radius of an image side surface of the fifth lens in the optical axis region.

5. The image capturing lens according to claim 1, wherein an Abbe number of the fourth lens falls within a range of 18 to 28.

6. The image capturing lens according to claim 1, wherein a refractive index Nd of the fourth lens falls within a range of 1.6 to 1.95.

7. The image capturing lens according to claim 1, further comprising an aperture disposed at the object side of the first lens.

8. The image capturing lens according to claim 1, further satisfying a conditional expression:

$$0.78 \le \frac{TTL}{2ImgH} \le 1.0$$

wherein ImgH is half a length of a diagonal of an effective pixel region on the image plane.

9. The image capturing lens according to claim 1, wherein a f-number of the image capturing lens falls within a range of 1.7 to 1.9.

* * * * *